(12) United States Patent
Lee

(10) Patent No.: US 11,450,026 B2
(45) Date of Patent: Sep. 20, 2022

(54) INFORMATION PROCESSING APPARATUS, INFORMATION PROCESSING METHOD, AND MOBILE OBJECT

(71) Applicant: SONY CORPORATION, Tokyo (JP)

(72) Inventor: Shun Lee, Saitama (JP)

(73) Assignee: SONY CORPORATION, Tokyo (JP)

( * ) Notice: Subject to any disclaimer, the term of this patent is extended or adjusted under 35 U.S.C. 154(b) by 52 days.

(21) Appl. No.: 16/956,449

(22) PCT Filed: Nov. 27, 2018

(86) PCT No.: PCT/JP2018/043537
§ 371 (c)(1),
(2) Date: Jun. 19, 2020

(87) PCT Pub. No.: WO2019/130945
PCT Pub. Date: Jul. 4, 2019

(65) Prior Publication Data
US 2021/0082143 A1 Mar. 18, 2021

(30) Foreign Application Priority Data
Dec. 27, 2017 (JP) .............................. JP2017-251434

(51) Int. Cl.
*B60W 60/00* (2020.01)
*G05D 1/02* (2020.01)
(Continued)

(52) U.S. Cl.
CPC .............. *G06T 7/74* (2017.01); *B60W 60/001* (2020.02); *H04N 5/2353* (2013.01);
(Continued)

(58) Field of Classification Search
USPC .......................................................... 348/148
See application file for complete search history.

(56) References Cited

U.S. PATENT DOCUMENTS

| | | |
|---|---|---|
| 2010/0191459 A1 | 7/2010 | Carter et al. |
| 2011/0243457 A1 | 10/2011 | Miyajima |
| | (Continued) | |

FOREIGN PATENT DOCUMENTS

| | | |
|---|---|---|
| CN | 102208012 A | 10/2011 |
| CN | 103782307 A | 5/2014 |
| | (Continued) | |

OTHER PUBLICATIONS

International Search Report and Written Opinion of PCT Application No. PCT/JP2018/043537, dated Feb. 19, 2019, 10 pages of ISRWO.

*Primary Examiner* — Patricia I Young
(74) *Attorney, Agent, or Firm* — Chip Law Group

(57) ABSTRACT

An information processing apparatus according to an embodiment of the present technology includes an acquisition unit and an execution unit. The acquisition unit acquires a plurality of estimation images captured from an identical spot under a plurality of exposure conditions different from each other, to estimate mobile object information including at least one of a location or a posture of a mobile object. The execution unit executes a process regarding estimation of the mobile object information on the basis of the plurality of acquired estimation images.

17 Claims, 17 Drawing Sheets

(51) Int. Cl.
*G08G 1/16* (2006.01)
*H04N 5/235* (2006.01)
*G06T 7/73* (2017.01)

(52) U.S. Cl.
CPC ....... *H04N 5/2356* (2013.01); *B60W 2420/42* (2013.01); *G06T 2207/10144* (2013.01); *G06T 2207/30252* (2013.01)

(56) References Cited

U.S. PATENT DOCUMENTS

2014/0098997 A1   4/2014  Faber et al.
2015/0312463 A1*  10/2015 Gupta ................ H04N 5/2355
                                                                 348/239

FOREIGN PATENT DOCUMENTS

| | | |
|---|---|---|
| CN | 108780615 A | 11/2018 |
| DE | 102011077038 A | 12/2012 |
| EP | 2372607 A2 | 10/2011 |
| EP | 2718869 A2 | 4/2014 |
| JP | 2010-170518 A | 8/2010 |
| JP | 2011-215057 A | 10/2011 |
| JP | 2014-525067 A | 9/2014 |
| JP | 2017-181476 A | 10/2017 |
| JP | 2017-181870 A | 10/2017 |
| WO | 2012/168055 A2 | 2/2013 |
| WO | 2017/168900 A1 | 10/2017 |

\* cited by examiner

INFORMATION PROCESSING APPARATUS, INFORMATION PROCESSING METHOD, AND MOBILE OBJECT

CROSS REFERENCE TO RELATED APPLICATIONS

This application is a U.S. National Phase of International Patent Application No. PCT/JP2018/043537 filed on Nov. 27, 2018, which claims priority benefit of Japanese Patent Application No. JP 2017-251434 filed in the Japan Patent Office on Dec. 27, 2017. Each of the above-referenced applications is hereby incorporated herein by reference in its entirety.

TECHNICAL FIELD

The present technology relates to an information processing apparatus, an information processing method, a program, and a mobile object, which are applied to self location estimation.

BACKGROUND ART

In the past, the technology of performing self location estimation for estimating a location or a posture of a mobile object such as a vehicle has been developed. Use of an estimation result of the location or the posture of the mobile object allows various services to be provided.

For example, Patent Literature 1 describes an autonomous driving car that performs movement control by using the self location estimation. In the autonomous driving car, observation information is acquired by using a sensor such as a camera installed in the autonomous driving car. Further, a reference map, which is to be a reference of an ambient environment, is referred to by the autonomous driving car. Matching between the reference map and the observation information is performed to allow accurate self location estimation of the autonomous driving car and allow high-accuracy movement control to be achieved (paragraphs [0019] and [0055], FIG. 5, and the like in the specification of Patent Literature 1).

CITATION LIST

Patent Literature

Patent Literature 1: Japanese Patent Application Laid-open No. 2017-181870

DISCLOSURE OF INVENTION

Technical Problem

The technology of estimating a location or a posture of a vehicle or the like is expected to be applied to various fields of autonomous driving, navigation, augmented reality (AR), and the like, and there is a demand for a technology capable of highly accurately estimating a location or a posture of a mobile object.

In view of the circumstances as described above, it is an object of the present technology to provide an information processing apparatus, an information processing method, a program, and a mobile object, which are capable of highly accurately estimating a location or a posture of a mobile object.

Solution to Problem

In order to achieve the object described above, an information processing apparatus according to an embodiment of the present technology includes an acquisition unit and an execution unit.

The acquisition unit acquires a plurality of estimation images captured from an identical spot under a plurality of exposure conditions different from each other, to estimate mobile object information including at least one of a location or a posture of a mobile object.

The execution unit executes a process regarding estimation of the mobile object information on the basis of the plurality of acquired estimation images.

In this information processing apparatus, in order to estimate mobile object information including at least one of a location or a posture of a mobile object, a plurality of estimation images is captured from an identical spot. The plurality of estimation images is captured under a plurality of exposure conditions different from each other and is used in a process regarding estimation of the mobile object information. In such a manner, use of the plurality of estimation images having different exposure conditions allows a location or a posture of the mobile object to be highly accurately estimated.

Each of the plurality of estimation images may be captured by an imaging apparatus installed in the mobile object. In this case, the execution unit may estimate the mobile object information on the basis of the plurality of acquired estimation images.

This allows an improvement in accuracy of the estimation process and allows a location or a posture of the mobile object to be highly accurately estimated.

The acquisition unit may be capable of acquiring reference information generated on the basis of location information of a predetermined spot and an image for reference captured from the predetermined spot. In this case, the execution unit may estimate the mobile object information on the basis of the plurality of acquired estimation images and the acquired reference information.

For example, the location information of the identical spot at which the plurality of estimation images is captured or the like is estimated with a predetermined spot as a standard, which allows a location or a posture of the mobile object to be highly accurately estimated.

The reference information may include a feature point of the image for reference. In this case, the execution unit may extract a feature point of each of the plurality of estimation images and execute a matching process between the extracted feature point and the feature point of the reference information.

This allows execution of a matching process by using feature points of the plurality of estimation images having different exposure conditions and allows matching accuracy to be significantly improved.

The reference information may include location information of the feature point of the image for reference. In this case, the execution unit may select a feature point for estimating the mobile object information from feature points of the plurality of estimation images on the basis of matching results of the matching process and estimate the mobile object information on the basis of the selected feature point and the location information of the feature point of the image for reference.

Thus, for example, selecting the feature points with a high matching rate allows an improvement in accuracy of the process of estimating the mobile object information and allows a location or a posture of the mobile object to be highly accurately estimated.

The acquisition unit may be capable of acquiring location information of the identical spot at which the plurality of estimation images is captured. In this case, the execution unit may generate reference information for estimating the mobile object information, on the basis of the plurality of acquired estimation images and the acquired location information of the identical spot.

This allows an improvement in accuracy of the reference information and allows a location or a posture of the mobile object to be highly accurately estimated.

The execution unit may extract a feature point of each of the plurality of estimation images and select a feature point for generating the reference information, on the basis of feature point information regarding the extracted feature point.

This allows a feature point having high extraction accuracy or the like to be appropriately selected, for example. As a result, the accuracy of the reference information can be sufficiently improved.

The feature point information may include at least one of the number of the feature points, a distribution of the feature points, or extraction accuracy of the feature points.

This allows an extraction status of the feature point of each estimation image to be evaluated in detail on the basis of the feature point information and allows a proper feature point to be easily selected, for example.

The execution unit may calculate location information of the selected feature point on the basis of the location information of the identical spot and generate the reference information including the calculated location information of the feature point.

Thus, the reference information including high-accuracy location information is generated. As a result, a location or a posture of the mobile object can be highly accurately estimated.

Each of the plurality of exposure conditions may include at least one of an exposure time or an exposure sensitivity.

This allows an improvement in estimation accuracy of the location or the posture using the feature points extracted from the plurality of estimation images.

The information processing apparatus may further include an imaging control unit that controls image capturing from the identical spot.

This allows image capturing of a subject to be easily controlled.

The imaging control unit may set a standard exposure condition that is a standard. In this case, the acquisition unit may acquire a standard estimation image captured under the standard exposure condition.

This allows a plurality of exposure conditions to be properly set with the standard exposure condition as a standard and allows an improvement in extraction accuracy or the like of the feature point.

The imaging control unit may divide the standard estimation image into a plurality of partial regions on the basis of at least one of a feature point extracted from the standard estimation image or an exposure state of the standard estimation image and set another exposure condition different from the standard exposure condition by executing an auto exposure for each of the plurality of partial regions.

This allows the exposure condition corresponding to the light and dark or the like of each partial region to be properly set. As a result, the feature point can be accurately extracted from the entire imaging range of the subject.

The imaging control unit may set another exposure condition different from the standard exposure condition with the standard exposure condition as a standard, on the basis of environment information regarding a surrounding environment of the mobile object.

This allows a proper exposure condition to be set in accordance with, for example, a change in surrounding environment and allows a measurement image with high extraction accuracy of feature points, or the like to be easily captured.

The imaging control unit may separate timings at which the plurality of estimation images is captured from a timing at which another image different from the plurality of estimation images is captured.

This can avoid an impact or the like on another process even in a case of using a plurality of exposure conditions and allows an improvement in reliability of the apparatus.

The imaging control unit may set a timing at which each of the plurality of estimation images is captured to a constant interval.

For example, repeating image capturing under similar exposure conditions at constant intervals allows another process to use the estimation image and, for example, image capturing of the subject can be efficiently performed.

The imaging control unit may be capable of sequentially executing image capturing of a first estimation image and a second estimation image. In this case, the information processing apparatus may further include a determination unit that determines whether image capturing of the second estimation image is necessary or not on the basis of the first estimation image acquired by the acquisition unit.

This can avoid unnecessary image capturing or the like and allows a process load associated with the image process or the like to be reduced.

An information processing method according to an embodiment of the present technology is an information processing method to be executed by a computer system, the information processing method including: acquiring a plurality of estimation images captured from an identical spot under a plurality of exposure conditions different from each other, to estimate mobile object information including at least one of a location or a posture of a mobile object; and executing a process regarding estimation of the mobile object information on the basis of the plurality of acquired estimation images.

An information processing method according to an embodiment of the present technology causes a computer system to execute the following steps of: acquiring a plurality of estimation images captured from an identical spot under a plurality of exposure conditions different from each other, to estimate mobile object information including at least one of a location or a posture of a mobile object; and executing a process regarding estimation of the mobile object information on the basis of the plurality of acquired estimation images.

A mobile object according to an embodiment of the present technology includes an acquisition unit, an execution unit, a planning unit, and a control unit.

The acquisition unit acquires a plurality of estimation images captured from an identical spot under a plurality of exposure conditions different from each other, to estimate mobile object information including at least one of a location or a posture of a mobile object.

The execution unit executes a process of estimating the mobile object information on the basis of the plurality of acquired estimation images.

The planning unit generates an action plan on the basis of the estimated mobile object information.

The control unit controls a behavior on the basis of the action plan.

Advantageous Effects of Invention

As described above, according to the present technology, it is possible to highly accurately estimating a location or a posture of a mobile object. Note that the effects described herein are not necessarily limited and any one of the effects described in this disclosure may be produced.

MODE(S) FOR CARRYING OUT THE INVENTION

Hereinafter, embodiments of the present technology will be described with reference to the drawings.

[Configuration of Vehicle Control System]

Figure 1A:
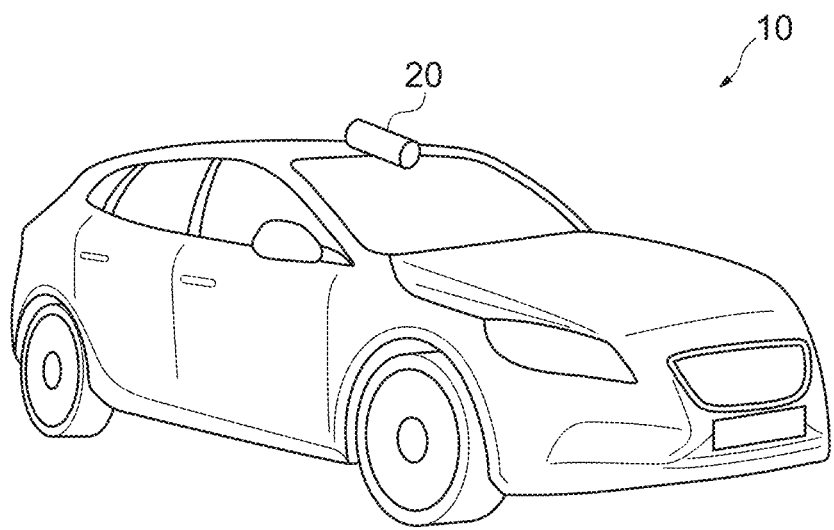
FIGS. 1A and 1B are external views illustrating a configuration example of a vehicle including an autonomous driving control unit according to a first embodiment of the present technology.
Figure 1B:
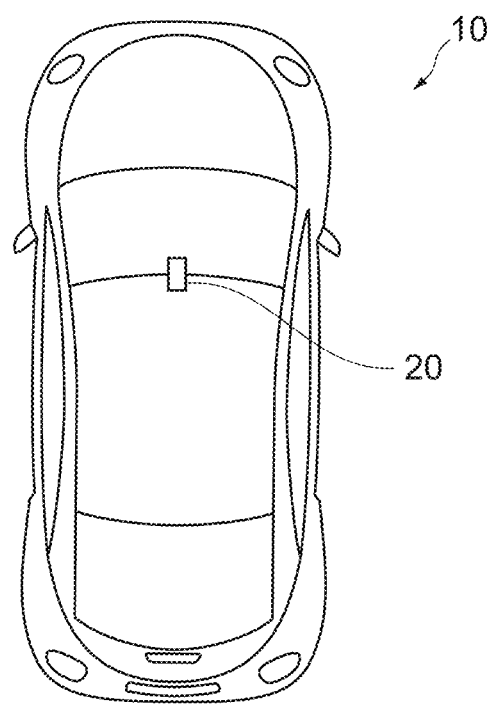

FIGS. 1A and 1B are external views illustrating a configuration example of a vehicle including an autonomous driving control unit according to a first embodiment of the present technology. FIG. 1A is a perspective view illustrating a configuration example of a vehicle 10. FIG. 1B is a schematic diagram obtained when the vehicle 10 is viewed from above. The vehicle 10 has an autonomous driving function capable of automatically driving to a destination. Note that the vehicle 10 is an example of a mobile object according to this embodiment.

As illustrated in FIGS. 1A and 1B, the vehicle 10 includes an imaging device 20 that captures an image of a surrounding environment around the vehicle 10. The imaging device 20 is disposed to be directed toward the front of the vehicle 10, for example, and appropriately captures images of buildings, roads, signs, and the like existing in the driving direction of the vehicle 10. The images (surrounding images 50) captured by the imaging device 20 are to be used in a self location estimation process or the like, which will be described later.

Figure 2:
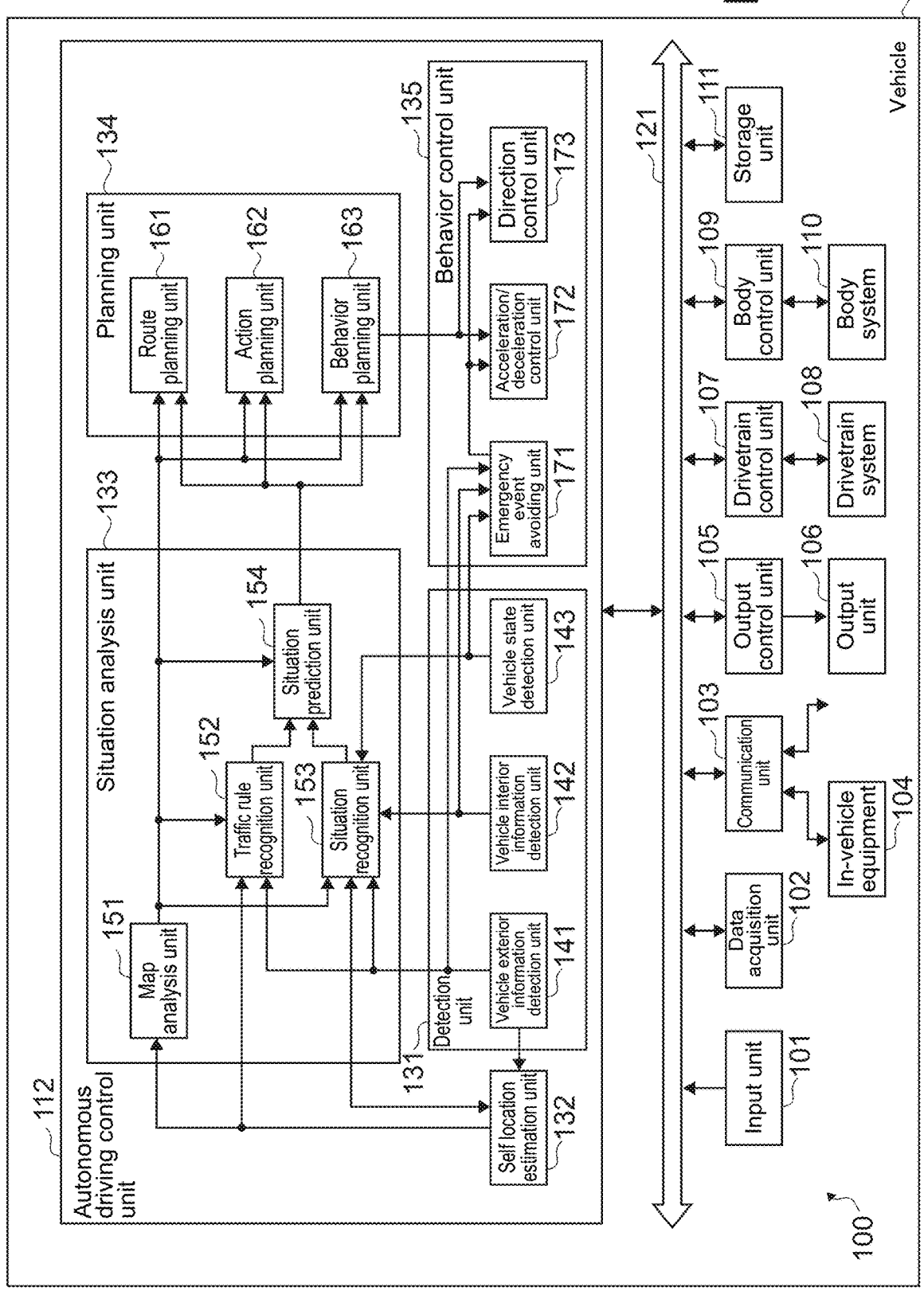
FIG. 2 is a block diagram illustrating a configuration example of a vehicle control system that controls the vehicle 10.

FIG. 2 is a block diagram illustrating a configuration example of a vehicle control system 100 that controls the vehicle 10. The vehicle control system 100 is a system that is installed in the vehicle 10 and that controls the vehicle 10 in various ways. Note that, hereinafter, the vehicle 10 is referred to as an own car or an own vehicle in the case of distinguishing the vehicle 10 from other vehicles.

The vehicle control system 100 includes an input unit 101, a data acquisition unit 102, a communication unit 103, in-vehicle equipment 104, an output control unit 105, an output unit 106, a drivetrain control unit 107, a drivetrain system 108, a body control unit 109, a body system 110, a storage unit 111, and an autonomous driving control unit 112. The input unit 101, the data acquisition unit 102, the communication unit 103, the output control unit 105, the drivetrain control unit 107, the body control unit 109, the storage unit 111, and the autonomous driving control unit 112 are connected to each other via a communication network 121. For example, the communication network 121 includes a bus or a vehicle-mounted communication network compliant with any standard such as a controller area network (CAN), a local interconnect network (LIN), a local area network (LAN), FlexRay (registered trademark), or the like. Note that sometimes the units of the vehicle control system 100 may be directly connected to each other without using the communication network 121.

Note that, hereinafter, description of the communication network 121 will be omitted in the case where the units of the vehicle control system 100 communicate with each other via the communication network 121. For example, simple description indicating that the input unit 101 and the autonomous driving control unit 112 communicate with each other will be given, in the case where the input unit 101 and the autonomous driving control unit 112 communicate with each other via the communication network 121.

The input unit 101 includes an apparatus used by a passenger to input various kinds of data, instructions, or the like. For example, the input unit 101 includes an operation device such as a touchscreen, a button, a microphone, a switch, or a lever, an operation device capable of inputting information by sound, gesture, or the like that is different from manual operation, or the like. Alternatively, for example, the input unit 101 may be external connection equipment such as a remote control apparatus using infrared or another radio wave, or mobile equipment or wearable equipment compatible with operation of the vehicle control system 100. The input unit 101 generates an input signal on the basis of data, an instruction, or the like input by a passenger, and supplies the generated input signal to the respective units of the vehicle control system 100.

The data acquisition unit 102 includes various kinds of sensors or the like for acquiring data to be used in processes performed by the vehicle control system 100, and supplies the acquired data to the respective units of the vehicle control system 100.

For example, the data acquisition unit 102 includes various kinds of sensors for detecting a state or the like of the vehicle 10. Specifically, for example, the data acquisition unit 102 includes a gyro sensor, an acceleration sensor, an inertial measurement unit (IMU), and sensors or the like for detecting an amount of operation of an accelerator pedal, an amount of operation of a brake pedal, an steering angle of a steering wheel, the number of revolutions of an engine, the number of revolutions of a motor, rotational speeds of wheels, and the like.

Further, for example, the data acquisition unit 102 includes various kinds of sensors for detecting information regarding the outside of the vehicle 10. Specifically, for example, the data acquisition unit 102 includes an imaging apparatus such as a time-of-flight (ToF) camera, a stereo camera, a monocular camera, an infrared camera, or another camera. Further, for example, the data acquisition unit 102 includes an environment sensor for detecting weather, a meteorological phenomenon, or the like, and a surrounding information detection sensor for detecting objects around the vehicle 10. For example, the environment sensor includes a raindrop sensor, a fog sensor, a sunshine sensor, a snow sensor, or the like. The surrounding information detection sensor includes an ultrasonic sensor, a radar, a LiDAR (Light Detection and Ranging, Laser Imaging Detection and Ranging) sensor, a sonar, or the like.

Furthermore, for example, the data acquisition unit 102 includes various kinds of sensors for detecting a current location of the vehicle 10. Specifically, for example, the data acquisition unit 102 includes a global navigation satellite system (GNSS) receiver or the like. The GNSS receiver receives satellite signals (hereinafter, referred to as GNSS signals) from a GNSS satellite serving as a navigation satellite.

Further, for example, the data acquisition unit 102 includes various kinds of sensors for detecting information regarding the inside of the vehicle 10. Specifically, for example, the data acquisition unit 102 includes an imaging apparatus that captures an image of a driver, a biological sensor that detects biological information of the driver, a microphone that collects sound within the interior of the vehicle, or the like. The biological sensor is, for example, disposed on a seat surface, the steering wheel, or the like, and detects biological information of a passenger sitting in a seat or the driver holding the steering wheel.

The communication unit 103 communicates with the in-vehicle equipment 104, various kinds of vehicle exterior equipment, a server, a base station, or the like, transmits data supplied by the respective units of the vehicle control system 100, and supplies the received data to the respective units of the vehicle control system 100. Note that a communication protocol supported by the communication unit 103 is not specifically limited. It is possible for the communication unit 103 to support a plurality of types of communication protocols.

For example, the communication unit 103 establishes wireless connection with the in-vehicle equipment 104 by using a wireless LAN, Bluetooth (registered trademark), near-field communication (NFC), wireless USB (WUSB), or the like. Further, for example, the communication unit 103 establishes wired connection with the in-vehicle equipment 104 by using Universal Serial Bus (USB), High-Definition Multimedia Interface (HDMI), Mobile High-Definition Link (MHL), or the like via a connection terminal (and a cable if necessary) (not illustrated).

Furthermore, for example, the communication unit 103 communicates with equipment (for example, an application server or a control server) present on an external network (for example, the Internet, a cloud network, or a company-specific network) via a base station or an access point. Further, for example, the communication unit 103 communicates with a terminal (for example, a terminal of a pedestrian or a store, or a machine-type communication (MTC) terminal) present in the vicinity of the vehicle 10 by using a peer-to-peer (P2P) technology. Furthermore, for example, the communication unit 103 carries out V2X communication such as vehicle-to-vehicle communication, vehicle-to-infrastructure communication, vehicle-to-home communication between the vehicle 10 and a home, or vehicle-to-pedestrian communication.

Further, for example, the communication unit 103 includes a beacon receiver, receives a radio wave or an electromagnetic wave transmitted from a radio station installed on a road or the like, and acquires information regarding the current location, traffic congestion, traffic regulation, necessary time, or the like.

The in-vehicle equipment 104 includes mobile equipment or wearable equipment possessed by a passenger, information equipment carried into or attached to the vehicle 10, a navigation apparatus that searches for a route to any destination, and the like, for example.

The output control unit 105 controls output of various kinds of information to the passenger of the vehicle 10 or to an outside of the vehicle 10. For example, the output control unit 105 generates an output signal that includes at least one of visual information (such as image data) or audio information (such as sound data), supplies the output signal to the output unit 106, and thereby controls output of the visual information and the audio information from the output unit 106. Specifically, for example, the output control unit 105 combines pieces of image data captured by different imaging apparatuses included in the data acquisition unit 102, generates a bird's-eye image, a panoramic image, or the like, and supplies an output signal including the generated image to the output unit 106. Further, for example, the output control unit 105 generates sound data including warning sound, a warning message, or the like with regard to danger such as collision, contact, or entrance into a danger zone, and supplies an output signal including the generated sound data to the output unit 106.

The output unit 106 includes an apparatus capable of outputting the visual information or the audio information to the passenger or the outside of the vehicle 10. For example, the output unit 106 includes a display apparatus, an instrument panel, an audio speaker, headphones, a wearable device such as an eyeglass type display worn by the passenger or the like, a projector, a lamp, or the like. Instead of an apparatus including a usual display, the display apparatus included in the output unit 106 may be, for example, an apparatus that displays the visual information within a field of view of the driver such as a head-up display, a transparent display, or an apparatus having an augmented reality (AR) function.

The drivetrain control unit 107 generates various kinds of control signals, supplies them to the drivetrain system 108, and thereby controls the drivetrain system 108. Further, as necessary, the drivetrain control unit 107 supplies the control signals to structural elements other than the drivetrain system 108 and notifies them of a control state of the drivetrain system 108 or the like.

The drivetrain system 108 includes various kinds of apparatuses related to the drivetrain of the vehicle 10. For example, the drivetrain system 108 includes a driving force generation apparatus for generating driving force of an internal combustion engine, a driving motor, or the like, a driving force transmitting mechanism for transmitting the driving force to wheels, a steering mechanism for adjusting the steering angle, a braking apparatus for generating braking force, an anti-lock braking system (ABS), an electronic stability control (ESC) system, an electric power steering apparatus, or the like.

The body control unit 109 generates various kinds of control signals, supplies them to the body system 110, and thereby controls the body system 110. Further, as necessary, the body control unit 109 supplies the control signals to structural elements other than the body system 110 and notifies them of a control state of the body system 110 or the like.

The body system 110 includes various kinds of body apparatuses provided to a vehicle body. For example, the body system 110 includes a keyless entry system, a smart key system, a power window apparatus, a power seat, the steering wheel, an air conditioner, various kinds of lamps (such as headlamps, tail lamps, brake lamps, direction-indicator lamps, and fog lamps), and the like.

The storage unit 111 includes read only memory (ROM), random access memory (RAM), a magnetic storage device such as a hard disc drive (HDD) or the like, a semiconductor storage device, an optical storage device, a magneto-optical storage device, or the like, for example. The storage unit 111 stores various kinds of programs, data, and the like used by respective units of the vehicle control system 100. For example, the storage unit 111 stores map data such as a three-dimensional high-accuracy map, a global map, and a local map. The high-accuracy map is a dynamic map or the like. The global map has lower accuracy than the high-accuracy map but covers wider area than the high-accuracy map. The local map includes information regarding surroundings of the vehicle 10.

The autonomous driving control unit 112 performs control with regard to autonomous driving such as autonomous travel or driving assistance. Specifically, for example, the autonomous driving control unit 112 performs cooperative control intended to implement functions of an advanced driver-assistance system (ADAS) which include collision avoidance or shock mitigation for the vehicle 10, following driving based on a following distance, vehicle speed maintaining driving, a warning of collision of the vehicle 10, a warning of deviation of the vehicle 10 from a lane, or the like. Further, for example, it is also possible for the autonomous driving control unit 112 to perform cooperative control intended for autonomous driving that makes the vehicle travel autonomously without depending on the operation of the driver or the like. The autonomous driving control unit 112 includes a detection unit 131, a self location estimation unit 132, a situation analysis unit 133, a planning unit 134, and a behavior control unit 135.

The autonomous driving control unit 112 corresponds to an information processing apparatus according to the present embodiment, and includes hardware necessary for a computer such as a CPU, RAM, and ROM, for example. An information processing method according to the present technology is executed when the CPU loads a program according to the present technology into the RAM and executes the program. The program is recorded on the ROM or the like in advance.

The specific configuration of the autonomous driving control unit 112 is not limited. For example, it is possible to use a programmable logic device (PLD) such as a field-programmable gate array (FPGA), or another device such as an application-specific integrated circuit (ASIC).

As illustrated in FIG. 2, the autonomous driving control unit 112 includes a detection unit 131, a self location estimation unit 132, a situation analysis unit 133, a planning unit 134, and a behavior control unit 135. For example, each of the functional blocks is configured when a CPU of the autonomous driving control unit 112 executes a predetermined program.

The detection unit 131 detects various kinds of information necessary to control autonomous driving. The detection unit 131 includes a vehicle exterior information detection unit 141, a vehicle interior information detection unit 142, and a vehicle state detection unit 143.

The vehicle exterior information detection unit 141 performs a process of detecting information regarding an outside of the vehicle 10 on the basis of data or signals from the respective units of the vehicle control system 100. For example, the vehicle exterior information detection unit 141 performs a detection process, a recognition process, a tracking process of objects around the vehicle 10, and a process of detecting distances to the objects. Examples of the detection target object include a vehicle, a person, an obstacle, a structure, a road, a traffic light, a traffic sign, a road sign, and the like. Further, for example, the vehicle exterior information detection unit 141 performs a process of detecting an ambient environment around the vehicle 10. Examples of the ambient environment around the detection target include weather, temperature, humidity, brightness, a road surface condition, and the like, for example. The vehicle exterior information detection unit 141 supplies data indicating results of the detection processes to the self location estimation unit 132, a map analysis unit 151, a traffic rule recognition unit 152, and a situation recognition unit 153 of the situation analysis unit 133, an emergency event avoiding unit 171 of the behavior control unit 135, and the like.

The vehicle interior information detection unit 142 performs a process of detecting information regarding an inside of the vehicle on the basis of data or signals from the respective units of the vehicle control system 100. For example, the vehicle interior information detection unit 142 performs an authentication process and a recognition process of the driver, a detection process of a state of the driver, a detection process of a passenger, a detection process of a vehicle interior environment, and the like. Examples of the state of the driver, which is a detection target, include a health condition, a degree of consciousness, a degree of concentration, a degree of fatigue, a gaze direction, and the like. Examples of the vehicle interior environment, which is a detection target, include temperature, humidity, brightness, smell, and the like. The vehicle interior information detection unit 142 supplies data indicating results of the detection processes to the situation recognition unit 153 of the situation analysis unit 133, the emergency event avoiding unit 171 of the behavior control unit 135, and the like.

The vehicle state detection unit 143 performs a process of detecting a state of the vehicle 10 on the basis of data or signals from the respective units of the vehicle control system 100. Examples of the state of the vehicle 10, which is a detection target, includes speed, acceleration, a steering angle, presence/absence of abnormality, a content of the abnormality, a driving operation state, a position and inclination of the power seat, a state of a door lock, states of other vehicle-mounted equipment, and the like. The vehicle state detection unit 143 supplies data indicating results of the detection processes to the situation recognition unit 153 of the situation analysis unit 133, the emergency event avoiding unit 171 of the behavior control unit 135, and the like.

The self location estimation unit 132 performs a process of estimating a location, a posture, and the like of the vehicle 10 on the basis of data or signals from the respective units of the vehicle control system 100 such as the vehicle exterior information detection unit 141 and the situation recognition unit 153 of the situation analysis unit 133. Further, as necessary, the self location estimation unit 132 generates a local map (hereinafter, referred to as a self location estimation map) to be used for estimating a self location. For example, the self location estimation map may be a high-accuracy map using a technology such as simultaneous localization and mapping (SLAM). The self location estimation unit 132 supplies data indicating a result of the estimation process to the map analysis unit 151, the traffic rule recognition unit 152, and the situation recognition unit 153 of the situation analysis unit 133, and the like. Further, the self location estimation unit 132 causes the storage unit 111 to store the self location estimation map.

Hereinafter, the process of estimating the location, the posture, and the like of the vehicle 10 will be referred to as a self location estimation process in some cases. Further, the information of the location and the posture of the vehicle 10 will be described as location/posture information. Therefore, the self location estimation process executed by the self location estimation unit 132 is a process of estimating the location/posture information of the vehicle 10. Note that in the present disclosure the location/posture information includes information of at least one of the location or the posture of the vehicle 10. Further, in the present disclosure, a self location includes a meaning of at least one of the location or the posture of the vehicle 10 itself. In this embodiment, the location/posture information of the vehicle 10 corresponds to mobile object information.

The situation analysis unit 133 performs a process of analyzing a situation of the vehicle 10 and a situation around the vehicle 10. The situation analysis unit 133 includes the map analysis unit 151, the traffic rule recognition unit 152, the situation recognition unit 153, and a situation prediction unit 154.

The map analysis unit 151 performs a process of analyzing various kinds of maps stored in the storage unit 111 and constructs a map including information necessary for an autonomous driving process while using data or signals from the respective units of the vehicle control system 100 such as the self location estimation unit 132 and the vehicle exterior information detection unit 141 as necessary. The map analysis unit 151 supplies the constructed map to the traffic rule recognition unit 152, the situation recognition unit 153, and the situation prediction unit 154, and to a route planning unit 161, an action planning unit 162, a behavior planning unit 163 of the planning unit 134, and the like.

The traffic rule recognition unit 152 performs a process of recognizing traffic rules around the vehicle 10 on the basis of data or signals from the respective units of the vehicle control system 100 such as the self location estimation unit 132, the vehicle exterior information detection unit 141, and the map analysis unit 151. The recognition process makes it possible to recognize locations and states of traffic lights around the vehicle 10, contents of traffic control around the vehicle 10, a drivable lane, and the like, for example. The traffic rule recognition unit 152 supplies data indicating a result of the recognition process to the situation prediction unit 154 and the like.

The situation recognition unit 153 performs a process of recognizing situations related to the vehicle 10 on the basis of data or signals from the respective units of the vehicle control system 100 such as the self location estimation unit 132, the vehicle exterior information detection unit 141, the vehicle interior information detection unit 142, the vehicle condition detection unit 143, and the map analysis unit 151. For example, the situation recognition unit 153 performs a process of recognizing a situation of the vehicle 10, a situation around the vehicle 10, a situation of the driver of the vehicle 10, and the like. Further, as necessary, the situation recognition unit 153 generates a local map (hereinafter, referred to as a situation recognition map) to be used for recognizing the situation around the vehicle 10. For example, the situation recognition map may be an occupancy grid map.

Examples of the situation of the vehicle 10, which is a recognition target, include a location, a posture, and movement (such as speed, acceleration, or a movement direction, for example) of the vehicle 10, presence/absence of abnormality, contents of the abnormality, and the like. Examples of the situation around the vehicle 10, which is a recognition target, include types and locations of surrounding still objects, types, locations, and movement (such as speed, acceleration, and movement directions, for example) of surrounding moving objects, structures of surrounding roads, conditions of road surfaces, ambient weather, temperature, humidity, brightness, and the like. Examples of the state of the driver, which is a recognition target, include a health condition, a degree of consciousness, a degree of concentration, a degree of fatigue, movement of gaze, driving operation, and the like.

The situation recognition unit 153 supplies data indicating a result of the recognition process (including the situation recognition map as necessary) to the self location estimation unit 132, the situation prediction unit 154, and the like. Further, the situation recognition unit 153 causes the storage unit 111 to store the situation recognition map.

The situation prediction unit 154 performs a process of predicting a situation related to the vehicle 10 on the basis of data or signals from the respective units of the vehicle control system 100 such as the map analysis unit 151, the traffic rule recognition unit 152, and the situation recognition unit 153. For example, the situation prediction unit 154 performs a process of predicting a situation of the vehicle 10, a situation around the vehicle 10, a situation of the driver, and the like.

Examples of the situation of the vehicle 10, which is a prediction target, includes behavior of the vehicle, occurrence of abnormality, a drivable distance, and the like. Examples of the situation around the vehicle 10, which is a prediction target, includes behavior of moving objects, change in states of traffic lights, change in environments such as weather, and the like around the vehicle 10. Examples of the situation of the driver, which is a prediction target, include behavior, a health condition, and the like of the driver.

The situation prediction unit 154 supplies data indicating results of the prediction processes to the route planning unit 161, the action planning unit 162, and the behavior planning unit 163 of the planning unit 134 and the like in addition to the data from the traffic rule recognition unit 152 and the situation recognition unit 153.

The route planning unit 161 plans a route to a destination on the basis of data or signals from the respective units of the vehicle control system 100 such as the map analysis unit 151 and the situation prediction unit 154. For example, the route planning unit 161 sets a route from the current location to a specified destination on the basis of the global map. Further, for example, the route planning unit 161 appropriately changes the route on the basis of situations such as traffic congestion, accidents, traffic regulation, and constructions, and a health condition and the like of the driver. The route planning unit 161 supplies data indicating the planned route to the action planning unit 162 and the like.

The action planning unit 162 plans an action of the vehicle 10 for driving safely in the route planned by the route planning unit 161 within a planned time period, on the basis of data or signals from the respective units of the vehicle control system 100 such as the map analysis unit 151 and the situation prediction unit 154. For example, the action planning unit 162 plans start, stop, a driving direction (for example, forward, backward, left turn, right turn, change of direction, etc.), a driving lane, driving speed, overtaking, and the like. The action planning unit 162 supplies data indicating the action planned for the vehicle 10 to the behavior planning unit 163 and the like.

The behavior planning unit 163 plans behavior of the vehicle 10 for achieving the action planned by the action planning unit 162 on the basis of data or signals from the respective units of the vehicle control system 100 such as the map analysis unit 151 and the situation prediction unit 154. For example, the behavior planning unit 163 plans acceleration, deceleration, a driving course, and the like. The behavior planning unit 163 supplies data indicating the planed behavior of the vehicle 10 to an acceleration/deceleration control unit 172, a direction control unit 173, and the like of the behavior control unit 135.

The behavior control unit 135 controls behavior of the vehicle 10. The behavior control unit 135 includes the emergency event avoiding unit 171, the acceleration/deceleration control unit 172, and the direction control unit 173.

The emergency event avoiding unit 171 performs a process of detecting collision, contact, entrance into a danger zone, or an emergency event such as abnormality in the driver or abnormality in the vehicle 10 on the basis of detection results obtained by the vehicle exterior information detection unit 141, the vehicle interior information detection unit 142, and the vehicle state detection unit 143. In the case where occurrence of an emergency event is detected, the emergency event avoiding unit 171 plans behavior of the vehicle 10 such as a quick stop or a quick turn for avoiding the emergency event. The emergency event avoiding unit 171 supplies data indicating the planned behavior of the vehicle 10 to the acceleration/deceleration control unit 172, the direction control unit 173, and the like.

The acceleration/deceleration control unit 172 controls acceleration/deceleration to achieve the behavior of the vehicle 10 planned by the behavior planning unit 163 or the emergency event avoiding unit 171. For example, the acceleration/deceleration control unit 172 computes a control goal value of the driving force generation apparatus or the braking apparatus to achieve the planned acceleration, deceleration, or quick stop, and supplies a control instruction indicating the computed control goal value to the drivetrain control unit 107.

The direction control unit 173 controls a direction to achieve the behavior of the vehicle 10 planned by the behavior planning unit 163 or the emergency event avoiding unit 171. For example, the direction control unit 173 computes a control goal value of the steering mechanism to achieve a driving course or quick turn planned by the behavior planning unit 163 or the emergency event avoiding unit 171, and supplies a control instruction indicating the computed control goal value to the drivetrain control unit 107.

Figure 3:
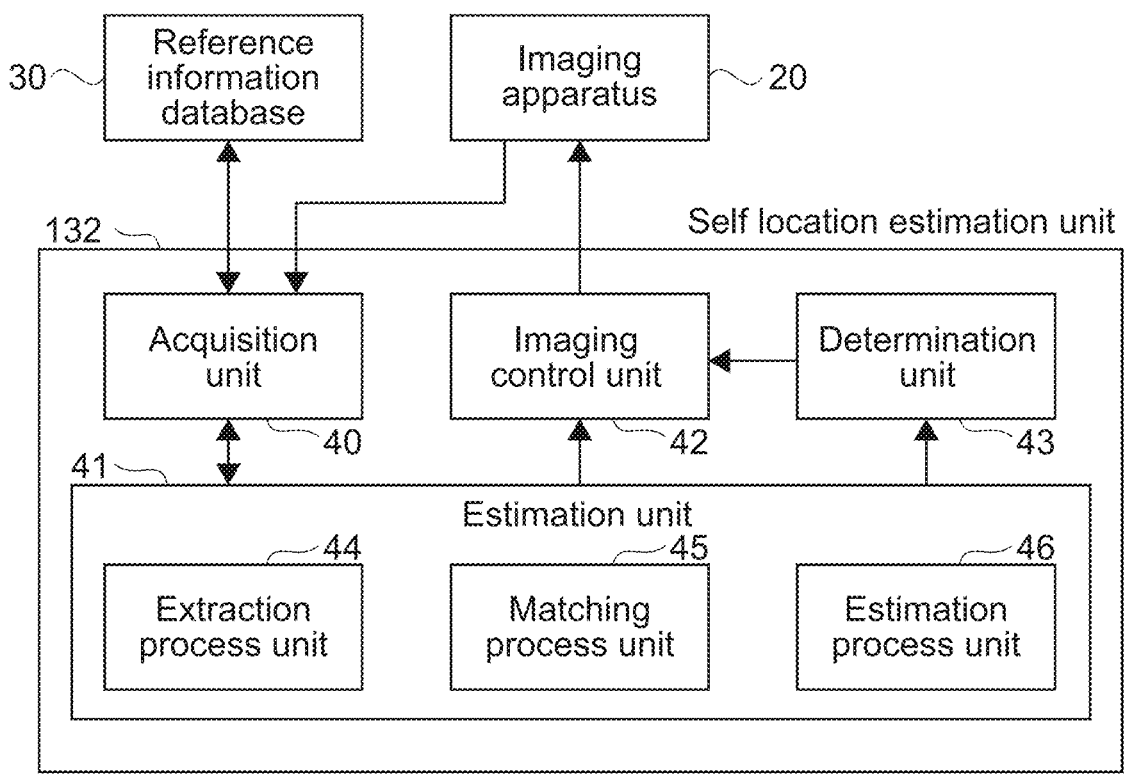
FIG. 3 is a block diagram illustrating a configuration example of a self location estimation unit illustrated in FIG. 2.

FIG. 3 is a block diagram illustrating a configuration example of the self location estimation unit 132 illustrated in FIG. 2. As illustrated in FIG. 3, a reference information database 30 and the imaging device 20 supply the self location estimation unit 132 with respective pieces of information necessary to estimate a self location of the vehicle 10.

The reference information database 30 is a database that stores a plurality of pieces of reference information. Here, the reference information is information to be referred to by the self location estimation unit 132 and is acquired in advance before a reference process is performed, and then stored in the reference information database 30. The reference information database 30 is provided to a server or the like configured to be connectable to the vehicle 10 via a predetermined network, for example.

The reference information is generated from an image of a driving environment where the vehicle 10 or the like drives (hereinafter, described as reference image). The reference information includes feature points extracted from the reference image and location information of the feature points. Here, the location information of the feature points is information for representing the locations of the respective feature points within the reference image in a map coordinate system. For example, three-dimensional coordinates (latitude, longitude, and altitude) of each feature point are calculated with an imaging spot, at which the reference image is captured, as a standard, and are recorded as location information of the feature point (see FIG. 7).

In such a manner, it can also be said that the reference information is information generated on the basis of location information of a predetermined imaging spot and a reference image captured at the predetermined imaging spot. Note that a specific configuration of the reference information is not limited. For example, the reference image may be recorded as the reference information together with the feature point. This allows an increase in accuracy of a matching process to be described later. Further, the location information (latitude and longitude) of the imaging spot at which the reference image is captured, information such as an imaging direction, and the like may be recorded as the reference information. In this embodiment, the reference image corresponds to an image for reference.

In this embodiment, the reference information is generated by another vehicle (hereinafter, described as vehicle for map generation) different from the vehicle 10. For example, the vehicle for map generation appropriately captures an image (reference image) of the surrounding of the vehicle for map generation by using a camera or the like installed therein. The reference information is generated on the basis of the captured reference image and the location information of the vehicle for map generation at the image capturing, that is, the location information of the imaging spot of the reference image. The generated reference information is uploaded to the server or the like via a predetermined network and is stored in the reference information database 30.

The method of acquiring the location information of the vehicle for map generation or the like is not limited. For example, the location information of the vehicle for map generation or the like may be acquired on the basis of at least one or more of a GNSS (Global Navigation Satellite System) signal (output of GPS sensor) that is a satellite signal from a navigation satellite, a geomagnetic sensor, wheel odometry, and SLAM. Further, the number of vehicles for map generation or the like is not limited, and one or more vehicles for map generation may be appropriately used.

The imaging device 20 is installed in the vehicle 10 and captures a surrounding image of the surrounding of the vehicle 10. For the surrounding image, for example, an image of a road, a building, and the like around the vehicle 10 is captured. The surrounding image is captured on the basis of a control signal that is output from an imaging control unit 42 of the self location estimation unit 132 to be described later. In this embodiment, the surrounding image captured by the imaging device 20 corresponds to an estimation image.

The imaging device 20 is constituted using a sensor of the data acquisition unit 102. For the imaging device 20, for example, a camera including an image sensor such as a charge coupled device (CCD) sensor or a complementary metal-oxide semiconductor (CMOS) sensor, or the like is used. A specific configuration of the imaging device 20 is not limited, and a time-of-flight (ToF) camera, a stereo camera, a monocular camera, an infrared camera, another camera, or the like may be appropriately used.

Figure 4:
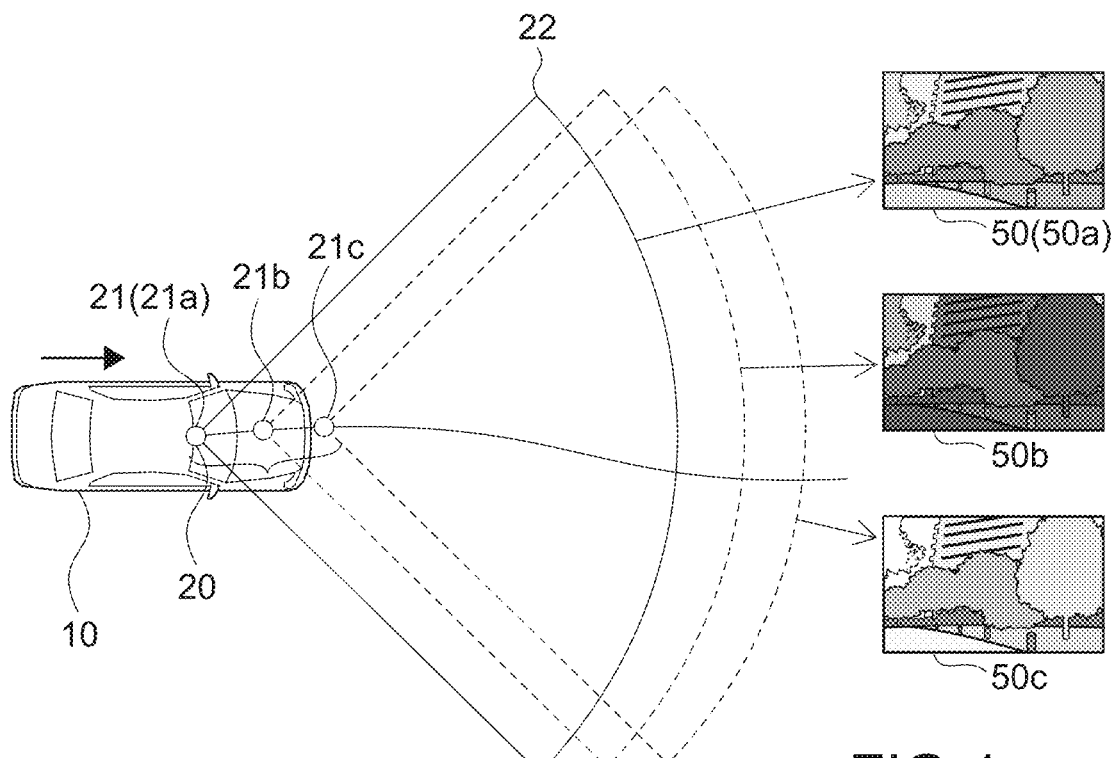
FIG. 4 is a schematic diagram illustrating an example of behavior of a vehicle when a surrounding image is captured.

FIG. 4 is a schematic diagram illustrating an example of the behavior of the vehicle 10 when a surrounding image is captured. FIG. 4 schematically illustrates a location of the imaging device 20 installed in the vehicle 10 (imaging spot 21 of surrounding image 50), an imaging range 22 of the imaging device 20, and a surrounding image 50 captured at the imaging spot 21. Note that the vehicle 10 (imaging device 20) is assumed to be on the road.

In this embodiment, a plurality of surrounding images 50 is captured from the identical imaging spot under a plurality of exposure conditions different from each other. In other words, while the vehicle 10 is at a nearly identical location, a plurality of surrounding images 50 is captured by changing exposure conditions.

In the example illustrated in FIG. 4, during movement of the vehicle 10, three surrounding images 50a to 50c having exposure conditions different from each other are consecutively captured. Image capturing of the surrounding images 50a to 50c is consecutively executed, for example, within a predetermined time (for example, several milliseconds to several hundreds of milliseconds).

In the present disclosure, "identical" is a concept including being substantially identical, that is, being nearly identical. For example, as illustrated in FIG. 4, imaging spots 21a to 21c of the surrounding images 50a to 50c consecutively captured during movement of the vehicle 10 are included in the identical imaging spot. Further, the surrounding images 50a to 50c consecutively captured during movement are included in the images captured from the identical imaging spot. Note that the plurality of surrounding images 50 may be captured from the completely identical spot in a state where the vehicle 10 is stopped.

The surrounding images 50a to 50c captured from the identical imaging spots 21a to 21c are captured images of the identical landscape (building, road, and the like). Meanwhile, the surrounding images 50a to 50c have different exposure conditions at the image capturing and are thus different from each other in the light and dark or the like. Those surrounding images 50 are used for a self location estimation process of estimating the location/posture information of the vehicle 10.

Note that the number of surrounding images 50 to be captured, time or timing for capturing each surrounding image, or the like is not limited. For example, appropriate settings may be provided so as to allow a self location estimation process with desired accuracy. In this embodiment, the identical imaging spot 21 corresponds to the identical spot.

The surrounding image captured by the imaging device 20 is supplied to an acquisition unit 40 of the self location estimation unit 132 via the vehicle exterior information detection unit 141 or the like illustrated in FIG. 2. Note that FIG. 3 omits the illustration of the vehicle exterior information detection unit 141. The present technology is not limited to the above, and a configuration in which the imaging device 20 and the acquisition unit 40 are directly connected to each other may be employed, for example.

The self location estimation unit 132 includes the acquisition unit 40, an estimation unit 41, an imaging control unit 42, and a determination unit 43.

The acquisition unit 40 acquires the surrounding image 50 of the surrounding of the vehicle 10, which is captured by the imaging device 20. As described with reference to FIG. 4, in this embodiment, images of the surrounding of the vehicle 10 are captured by the imaging device 20 from the identical imaging spot 21 under a plurality of different exposure conditions. The surrounding images of the surrounding of the vehicle 10 are appropriately supplied to the acquisition unit 40. In such a manner, the acquisition unit 40 acquires the plurality of surrounding images 50 captured from the identical imaging spot 21 under the plurality of different exposure conditions.

Further, the acquisition unit 40 can acquire the reference information recorded in the reference information database 30. The acquisition unit 40 appropriately accesses the server or the like via the communication unit 103 illustrated in FIGS. 1A and 1B and downloads necessary reference information. Note that FIG. 3 omits the illustration of the communication unit 103.

In this embodiment, a plurality of pieces of reference information retrieved from the reference information database 30 on the basis of a predetermined retrieval condition is acquired. The predetermined retrieval condition is a condition for retrieving reference information generated around the current location of the vehicle 10, for example. Therefore, the acquisition unit 40 acquires the plurality of pieces of reference information generated on the basis of the scenery (reference image) around the current location of the vehicle 10 or the like. The method of acquiring the reference information from the reference information database 30 will be described later in detail.

The estimation unit 41 executes the self location estimation process of estimating the location/posture information of the vehicle 10 on the basis of the plurality of surrounding images 50. By the self location estimation process, for example, the current location (latitude and longitude), the posture (orientation of driving direction), and the like of the vehicle 10 in the map coordinate system are estimated. In this embodiment, the self location estimation process corresponds to a process regarding estimation of the mobile object information, and the estimation unit 41 corresponds to an execution unit.

In this embodiment, the estimation unit 41 executes the self location estimation process using the reference information. In other words, it can also be said that the estimation unit 41 estimates the location/posture information of the vehicle 10 on the basis of a plurality of estimation images and the reference information.

As illustrated in FIG. 3, the estimation unit 41 includes an extraction process unit 44, a matching process unit 45, and an estimation process unit 46.

The extraction process unit 44 extracts a feature point from the surrounding image 50. For example, a plurality of feature points included in the surrounding image is appropriately extracted. At that time, a feature quantity (feature intensity or the like) is calculated for each feature point. Therefore, it can also be said that a plurality of feature points and feature quantities of the respective feature points are extracted from the surrounding image 50. Hereinafter, a plurality of feature points extracted from the surrounding image 50 will be described simply as a feature point of the surrounding image 50 in some cases.

Figure 5:
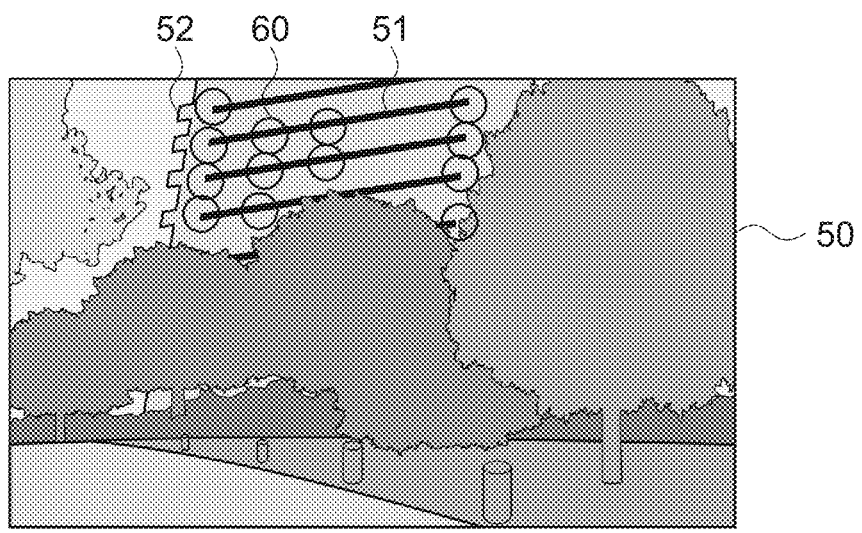
FIG. 5 is a schematic diagram illustrating an example of feature points extracted from the surrounding image.

FIG. 5 is a schematic diagram illustrating an example of feature points extracted from the surrounding image 50. In FIG. 5, each feature point 60 extracted from the surrounding image 50 is schematically illustrated with a circle. Note that the location of the feature point 60 is a location at the center of the circle. In the example of FIG. 5, for example, the shape, a corner, or the like of a window 51 of a building is extracted as the feature point 60. Further, a feature quantity of each feature point 60 is calculated in association with extraction of each feature point 60.

In general, in a case where the feature point 60 is extracted from an image, the number of feature points 60 to be extracted and the extraction accuracy have values corresponding to the state of the image. For example, the number of feature points 60 to be extracted and the extraction accuracy may vary depending on how the subject appears in an image (for example, light and dark, contrast, etc.) even among images of the identical subject.

For example, in the example illustrated in FIG. 5, the brightness of the background and that of a wall surface of the building are close to each other, and thus a feature point is not extracted from the shape of a balcony 52 or the like of the building (shape of exterior wall etc.). Note that, in an image having difference in brightness between the background and the wall surface of the building and having high contrast, the feature point 60 may be extracted from the shape of the balcony 52.

The feature point extraction process is executed for each of the plurality of surrounding images 50 acquired. Therefore, the extraction process unit 44 extracts the feature point 60 of each of the plurality of surrounding images 50. The method of extracting the feature point 60 or the like is not limited. For example, any algorithm capable of extracting the feature point 60 from image data or the like may be appropriately used. Further, for example, the feature point 60 may be extracted using machine learning or the like.

The matching process unit 45 executes a matching process between the surrounding image 50 and the reference information. Specifically, the matching process (feature point matching) between the feature point 60 extracted from the surrounding image 50 and the feature point 60 of the reference information (reference image) is executed.

Figure 6:
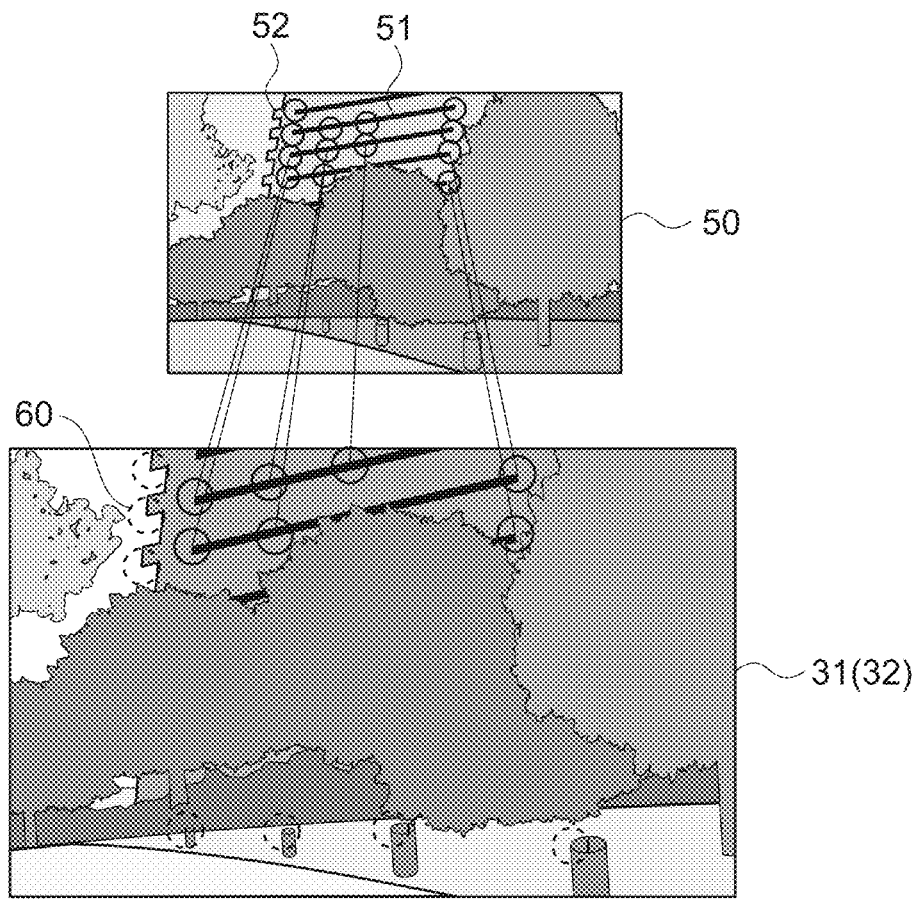
FIG. 6 is a schematic diagram illustrating an example of a matching process.

FIG. 6 is a schematic diagram illustrating an example of the matching process. In FIG. 6, the matching process between the surrounding image 50 (upper-side diagram of FIG. 6) described with reference to FIG. 5 and reference information 31 (lower-side diagram of FIG. 6) is executed. In FIG. 6, a reference image 32 is schematically illustrated as the reference information 31.

In the matching process, a pair of feature points 60 having high similarity is calculated from, for example, the feature points 60 of the surrounding image 50 and the feature points 60 of the reference image 32. In the example illustrated in FIG. 6, pairs between the surrounding image 50 and the reference image 32, which are determined to have high similarity by the matching process, are illustrated by corresponding straight lines. In the example illustrated in FIG. 6, the feature points 60 of the window 51 of the building, which are included in common in the surrounding image 50 and the reference image 32, are calculated as a pair of similar feature points 60.

Further, as illustrated in the lower-side diagram of FIG. 6, for other feature points 60 (dotted circles) included in the reference information 31 (reference image 32), corresponding feature points 60 are not extracted in the surrounding image 50, and thus pairs of feature points 60 are not calculated therefor. Note that in the matching process, a false pair of feature points 60, that is, a pair of feature points 60 that are not the identical point actually may be calculated.

Matching results of the matching process include the number of pairs of matched feature points, a matching rate (similarity) of each pair, and the like. Further, the degree of similarity (total matching rate) indicating how much the reference information 31 (reference image 32) and the surrounding image 50 are similar to each other, and the like are calculated as the matching results. A specific method for the matching process or the like is not limited. For example, any algorithm capable of executing the feature point matching or the like may be used.

In this embodiment, the matching process for the reference information 31 and each of the plurality of surrounding images 50 having different exposure conditions is executed. In other words, the matching process unit 45 executes the matching process between the feature point 60 extracted from each of the plurality of surrounding images 50 and the feature point of the reference information 31. Note that the reference information 31 to be subjected to the matching process with respect to the plurality of surrounding images 50 is appropriately selected. This will be described later in detail.

Further, the matching process unit 45 selects a feature point 60 for estimating the location/posture information of the vehicle 10 from the feature points 60 of the plurality of surrounding images 50 on the basis of the matching results of the matching process. Hereinafter, the selected feature point 60 will be described as an estimation feature point 61 in some cases.

The estimation process unit 46 estimates the location and the posture of the vehicle 10. In this embodiment, the location/posture information of the vehicle 10 is estimated on the basis of the feature point 60 (estimation feature point 61) selected by the matching process unit 45 and the location information of the feature point 60 of the reference image 32. For example, with the location information of the feature point 60 of the reference image 32 (three-dimensional coordinates of map coordinate system) as a standard, the imaging spot 21 of the surrounding image 50 at which the estimation feature point 61 is extracted, the imaging direction, and the like are calculated, and the current location and posture of the vehicle 10 in the map coordinate system are estimated.

The imaging control unit 42 controls image capturing of the surrounding image 50 by the imaging device 20. The imaging control unit 42 sets exposure conditions for capturing the surrounding images 50. In this embodiment, an exposure time and an exposure sensitivity (gain) are set as the exposure condition, but the present technology is not limited thereto as a matter of course. One of the exposure time and the exposure sensitivity may be set as the exposure condition. Further, another parameter capable of adjusting the exposure amount of the surrounding image 50 or the like may be used as the exposure condition.

Further, the imaging control unit 42 sets a timing at which the surrounding image 50 is to be captured, or the like. For example, as illustrated in FIG. 4, an imaging timing under each exposure condition is appropriately set such that image capturing under a plurality of exposure conditions is performed within a predetermined time. In such a manner, image capturing from the identical imaging spot 21 is controlled by the imaging control unit 42. The information regarding the set exposure conditions or timing is appropriately output as a control signal to the imaging device 20.

The determination unit 43 determines whether image capturing under changed exposure conditions is necessary or not. As described above, the imaging control unit 42 can set imaging timings under different exposure conditions and can sequentially execute image capturing of a first surrounding image and a second surrounding image. Here, the first and second surrounding images are surrounding images captured under different exposure conditions.

For example, it is assumed that the imaging control unit 42 executes image capturing of the first surrounding image under a certain exposure condition. In this case, the determination unit 43 determines whether the image capturing of the second surrounding image is necessary or not on the basis of the first surrounding image acquired by the acquisition unit 40. A result of the determination by the determination unit 43 is output to the imaging control unit 42, and the image capturing of the second surrounding image is executed/stopped.

In such a manner, it can also be said that the determination unit 43 determines whether image capturing under changed exposure conditions is necessary or not on the basis of the surrounding image 50 acquired before. In other words, the imaging device 20 is not limited to the case where image capturing under a plurality of exposure conditions is executed from the identical imaging spot 21, and it may be possible to capture a single surrounding image 50 from a certain imaging spot 21 under a predetermined exposure condition.

Figure 7:
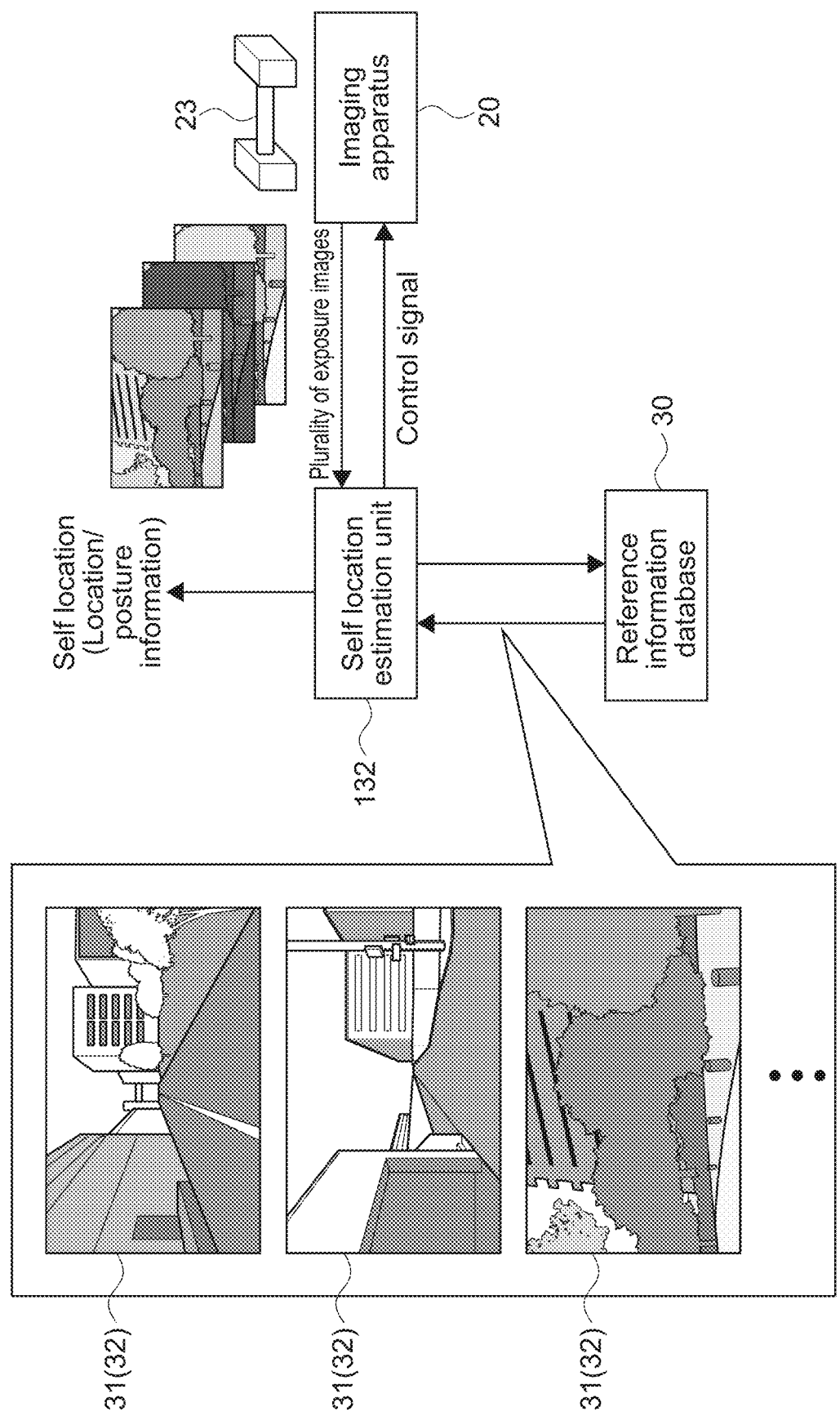
FIG. 7 is a schematic diagram illustrating the general outline of a basic behavior of the self location estimation unit.

FIG. 7 is a schematic diagram illustrating the general outline of a basic behavior of the self location estimation unit 132. FIG. 7 schematically illustrates a stereo camera 23 (imaging device 20) installed in the vehicle 10. Further, three reference images 32 are schematically illustrated as the example of the reference information 31 acquired from the reference information database 30. Note that, in FIG. 7, the illustration of the feature point 60 of the reference image 32 or the like is omitted.

In the vehicle 10 during operation, the stereo camera 23 appropriately captures the surrounding image 50 of the vehicle 10 on the basis of a control signal from the self location estimation unit 132. This image capturing can be executed from the identical imaging spot 21 under a plurality of exposure conditions. Further, in the vehicle 10 during operation, the self location estimation unit 132 appropriately retrieves a plurality of pieces of reference information 31 for executing the self location estimation process of the vehicle 10 from the reference information database 30.

The self location estimation process of estimating the location and posture (location/posture information) of the vehicle 10 is executed on the basis of the plurality of surrounding images 50 captured by the imaging device 20 and the plurality of pieces of reference information 31 retrieved from the reference information database 30. The estimated location/posture information is supplied to the situation analysis unit 133, the planning unit 134, or the like illustrated in, for example, FIG. 2 and is used for the movement control of the vehicle 10 or the like.

Figure 8:
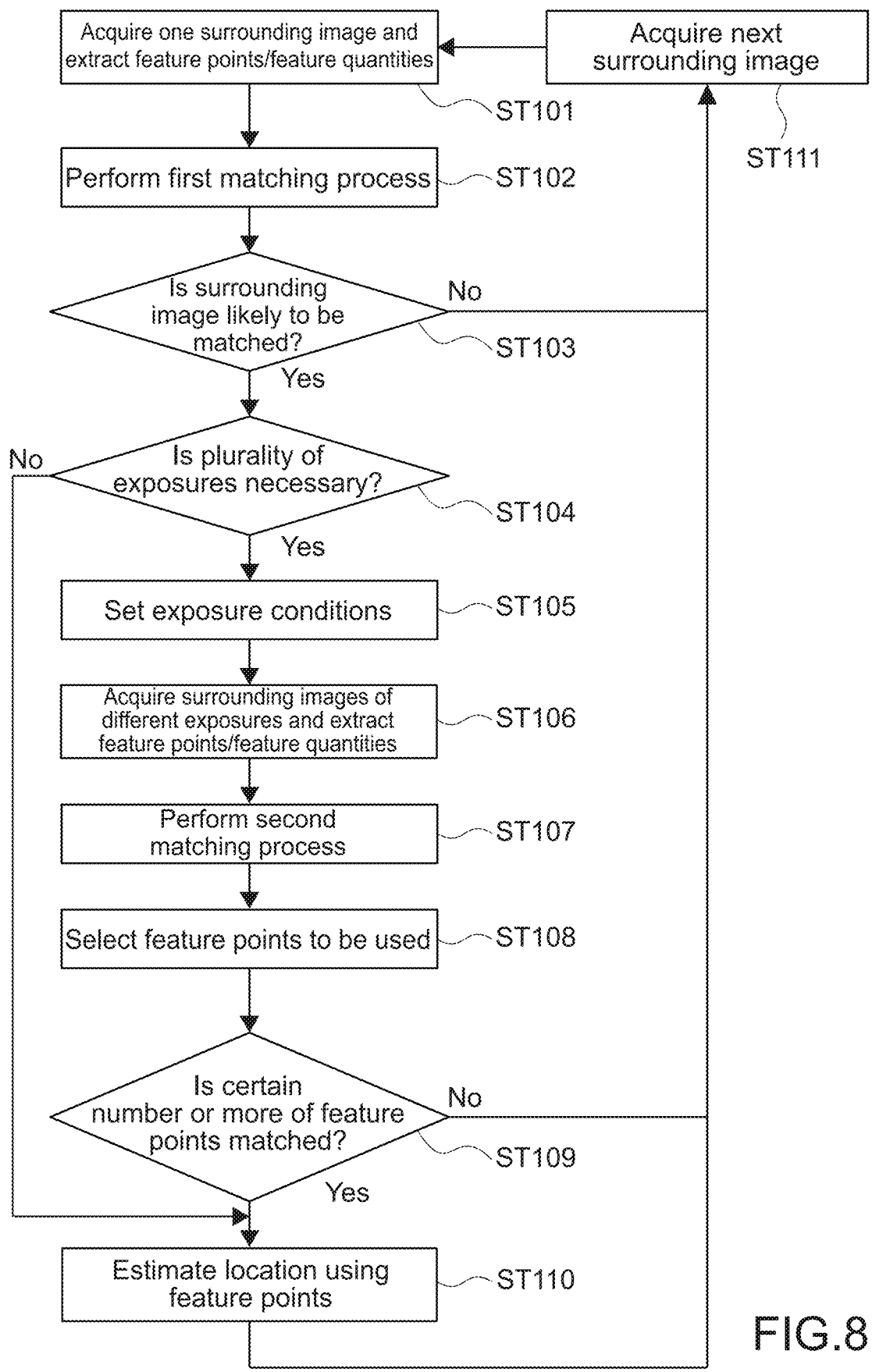
FIG. 8 is a flowchart illustrating an example of a self location estimation process.
Figure 9:
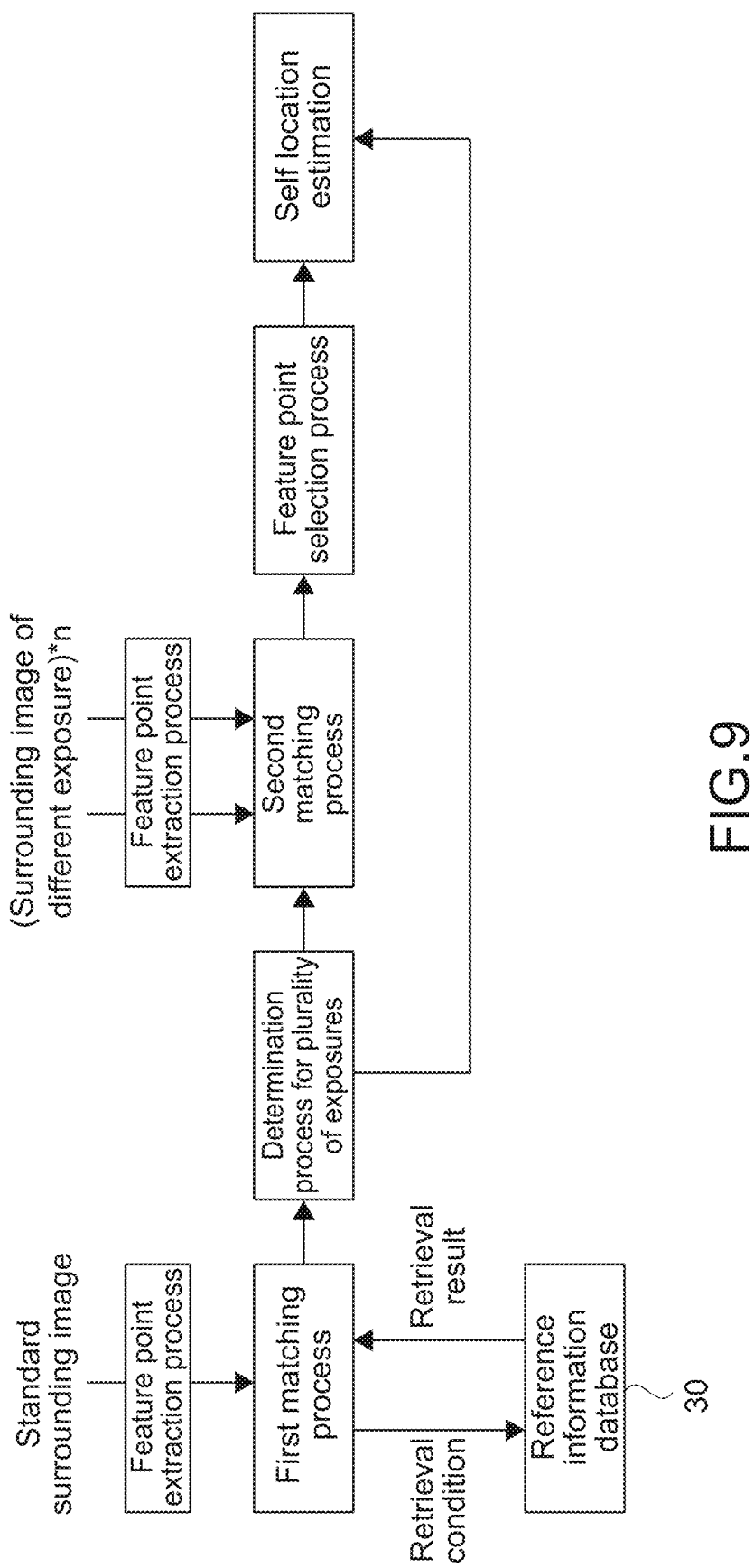
FIG. 9 is a schematic diagram illustrating an example of an internal process executed in the self location estimation process illustrated in FIG. 8.

FIG. 8 is a flowchart illustrating an example of the self location estimation process. FIG. 9 is a schematic diagram illustrating an example of the internal process executed in the self location estimation process illustrated in FIG. 8. Hereinafter, an example of the self location estimation process will be specifically described with reference to FIGS. 8 and 9.

As illustrated in FIG. 8, an image of the surrounding of the vehicle 10 is captured, and one surrounding image 50 is acquired. Feature points 60/feature quantities are extracted from the acquired surrounding image (Step 101).

In this embodiment, first, the imaging control unit 42 sets a standard exposure condition to be the standard. The standard exposure condition is an exposure condition to be used as a reference for another exposure condition, for example. The standard exposure condition is set by, for example, performing an auto exposure adjustment (AEAG) or the like on the entire imaging range of the imaging device 20. This makes it possible to easily set the exposure condition (exposure time, exposure sensitivity, and the like) to be the reference. Note that the method of setting the standard exposure condition or the like is not limited.

The imaging device 20 captures an image of the surrounding of the vehicle 10 under the standard exposure condition. The acquisition unit 40 then acquires a standard surrounding image 50a captured under the standard exposure condition. The standard surrounding image 50a is a surrounding image 50 acquired in Step 101. When the standard surrounding image 50a is acquired, the extraction process unit 44 extracts a feature point 60/feature quantity from the standard surrounding image 50a. In this embodiment, the standard surrounding image 50a corresponds to a standard estimation image.

The matching process unit 45 executes a matching process (first matching process) between the feature point 60 of the standard surrounding image 50a and a feature point 60 of each of the plurality of pieces of reference information 31 (Step 102). As illustrated in FIG. 9, the plurality of pieces of reference information 31 is appropriately retrieved from the reference information database 30 on the basis of a predetermined retrieval condition. For the predetermined retrieval condition, for example, rough location information (location information detected on the basis of autonomous navigation, GPS sensor, or the like) of the vehicle 10 or the like is used.

For example, the acquisition unit 40 transmits an instruction of retrieving the reference information 31 generated around the spot indicated by the rough location information of the vehicle 10, as a retrieval condition, to a server or the like including the reference information database 30. The server or the like searches the reference information database 30 on the basis of the retrieval condition, and the reference information 31 matched with the retrieval condition is transmitted to the acquisition unit 40. This makes it possible to acquire the plurality of pieces of reference information 31 generated around the vehicle 10, for example.

Note that the range of retrieving the reference information 31 is appropriately set in accordance with, for example, the accuracy of the rough location information or the like. The method of retrieving the reference information 31 from the reference information database 30 or the like is not limited. For example, the reference information 31 may be retrieved on the basis of the feature point 60 of the standard surrounding image 50*a*, which is extracted in Step 101, or the like.

When matching results between the plurality of pieces of reference information 31 and the standard surrounding image 50*a* are calculated by the first matching process, whether the standard surrounding image 50*a* is likely to be matched with the reference information 31 or not is determined on the basis of the matching results (Step 103). In this determination, for example, the degree of similarity between the standard surrounding image 50*a* and the reference information 31 is used.

As described above, the degree of similarity is a value indicating how much the reference information 31 (reference image 32) and the surrounding image 50 are similar to each other. For example, in a case where the number of pairs of matched feature points 60 is large and the matching rate of each pair is high, the degree of similarity is set to be high. Further, in a case where the number of pairs is small but in a case where, for example, the pairs having a high matching rate are concentrated in a certain region (see FIG. 6), there is a high possibility that the surrounding image 50 and the reference image 32 include a similar subject. Also in such a case, the degree of similarity is set to be high.

Conversely, in a case where the matching rate of the pair of feature points 60 is high but in a case where the number of feature points 60 is small and the feature points are sparse, the degree of similarity is set to be low. In such a manner, the degree of similarity is appropriately set in accordance with the matching rate, the number, the distribution, and the like of the matched feature points (pairs). Note that the method of setting the degree of similarity or the like is not limited.

In Step 103, for example, it is determined whether or not there is reference information 31 in which the degree of similarity with the standard surrounding image 50*a* is larger than a first threshold. Note that the first threshold is appropriately set such that the determination on the degree of similarity between the standard surrounding image 50*a* and the reference information 31 is executed at desired accuracy.

For example, in a case where there is no reference information 31 in which the degree of similarity with the standard surrounding image 50*a* is larger than the first threshold, it is determined that there is no reference information 31 similar to the standard surrounding image 50*a* and that the standard surrounding image 50*a* is not matched with the reference information 31 (No in Step 103). In this case, a preparation process for acquiring the next standard surrounding image 50*a* is executed (Step 111), and Step 101 is executed again.

Further, in a case where there is reference information 31 in which the degree of similarity with the standard surrounding image 50*a* is larger than the first threshold, it is determined that there is reference information 31 similar to the standard surrounding image 50*a* and that the standard surrounding image 50*a* is likely to be matched with the reference information 31 (Yes in Step 103). In this case, the determination unit 43 determines whether image capturing under an exposure condition different from the standard exposure condition is necessary or not (Step 104).

For example, in a case where a sufficient number of feature points 60 is extracted from the standard surrounding image 50*a* and the feature points 60 are sufficiently distributed in the entire image, there is a possibility that a high degree of similarity with the reference image 32 is calculated. In such a case, self location estimation based on the standard surrounding image 50*a* is executed without performing the image capturing under a plurality of exposure conditions. In such a manner, the determination unit 43 determines whether image capturing of a surrounding image 50, which is to be captured after the standard surrounding image 50*a* is captured, is necessary or not on the basis of the standard surrounding image 50*a*.

In this embodiment, the determination unit 43 determines whether or not there is reference information 31 in which the degree of similarity with the standard surrounding image 50*a* is larger than a second threshold. Note that the second threshold is set to be a lager value than the first threshold. This makes it possible to determine whether or not there is reference information 31 having a sufficiently high degree of similarity.

In a case where it is determined that there is reference information 31 in which the degree of similarity with the standard surrounding image 50*a* is larger than the second threshold (Yes in Step 104), Step 110 to be described later is executed, and the self location estimation is executed on the basis of the standard surrounding image 50*a*.

Further, in a case where it is determined that there is no reference information 31 in which the degree of similarity with the standard surrounding image 50*a* is larger than the second threshold (No in Step 104), it is determined that image capturing of a plurality of surrounding images 50 under a plurality of exposure conditions is necessary, and the imaging control unit 42 sets a plurality of exposure conditions (Step 105).

Figure 10:
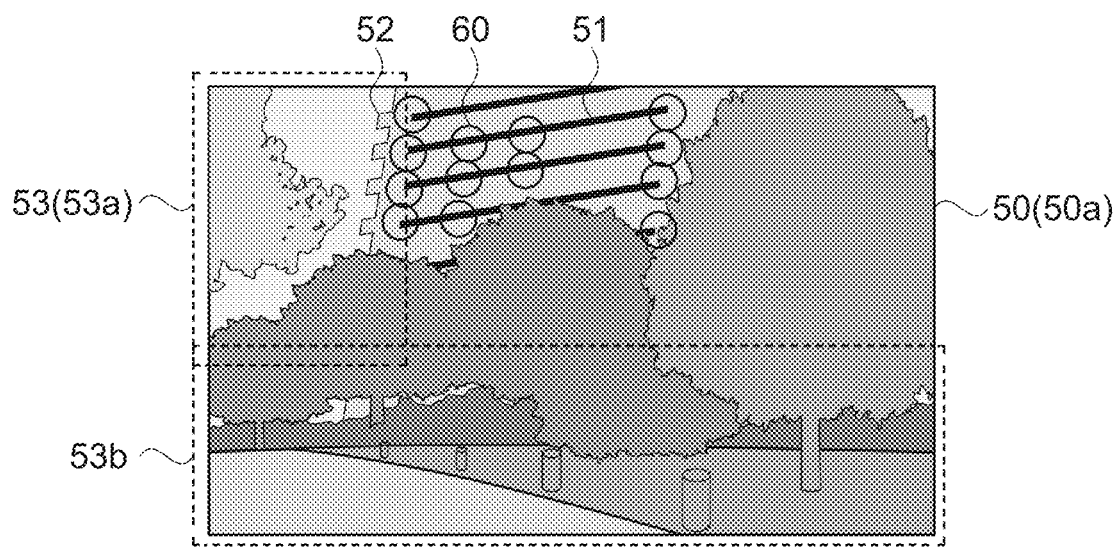
FIG. 10 is a schematic diagram for describing an example of a method of setting exposure conditions.

FIG. 10 is a schematic diagram for describing an example of the method of setting the exposure conditions. FIG. 10 is a schematic diagram illustrating an example of the standard surrounding image 50*a*. In this embodiment, the imaging control unit 42 divides the standard surrounding image 50*a* into a plurality of partial regions 53. For example, the partial regions 53 are set on the basis of the distribution of the feature points 60 extracted from the standard surrounding image 50*a* and an exposure state such as luminance information of the standard surrounding image 50*a*.

In the example illustrated in FIG. 10, a partial region 53*a* and a partial region 53*b* are schematically illustrated. The partial region 53*a* is a region where there are few feature points 60 and where blown-out highlights or the like of the luminance values occur. Further, the partial region 53*b* is a region where there are few feature points 60 and where blocked-up shadows or the like of the luminance values occur. In the regions such as the partial regions 53*a* and 53*b*, the contrast or the like is reduced due to the extremely bright or dark image, which makes it difficult to extract the feature points 60.

In such a manner, the imaging control unit 42 divides the standard surrounding image 50*a* into a plurality of partial regions 53 on the basis of the feature points 60 extracted from the standard surrounding image 50*a* and the exposure state of the standard surrounding image 50*a*. The method of dividing the standard surrounding image into the partial regions 53 is not limited, and for example, the partial regions 53 may be set on the basis of one of the feature points 60 extracted from the standard surrounding image 50*a* and the exposure state of the standard surrounding image 50a. Further, the partial regions 53 may be set using another parameter such as the contrast or the like of the standard surrounding image 50a.

The imaging control unit 42 executes the auto exposure adjustment (AEAG) for each of the plurality of partial regions to thus set other exposure conditions different from the standard exposure condition. In this embodiment, the auto exposure adjustment corresponds to an auto exposure.

Figure 11A:
FIGS. 11A and 11B are schematic diagrams illustrating an example of surrounding images captured under other exposure conditions.

As illustrated in FIG. 10, the partial region 53a is a bright region as a whole. Therefore, the auto exposure adjustment for the partial region 53a is performed to set an exposure condition (first exposure condition) having a shorter exposure time and a lower exposure sensitivity than those of the standard exposure condition. Use of the first exposure condition allows image capturing of a surrounding image 50 having, for example, an increased contrast in the partial region 53a and a clear shape of the exterior wall (balcony 52) of the building or the like (FIG. 11A).

Figure 11B:
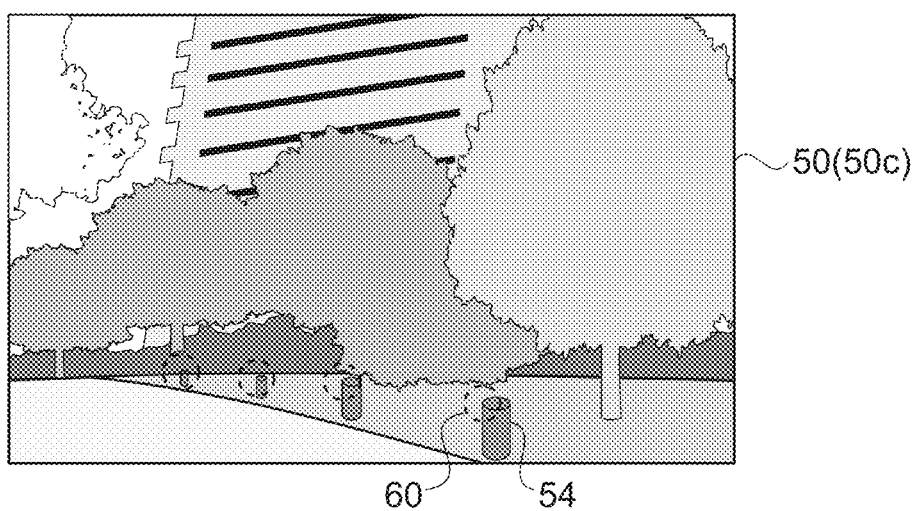

Further, as illustrated in FIG. 10, the partial region 53b is a dark region as a whole. Therefore, the auto exposure adjustment for the partial region 53b is performed to set an exposure condition (second exposure condition) having a longer exposure time and a higher exposure sensitivity than those of the standard exposure condition. Use of the second exposure condition allows image capturing of a surrounding image 50 having, for example, an increased contrast in the partial region 53b and a clear shape of a pole 54 or the like on the roadside (FIG. 11B).

Other methods of setting the exposure conditions include a method of adjusting the standard exposure condition on the basis of environment information regarding the surrounding environment of the vehicle 10. Here, the environment information is, for example, information of weather, time, location (shadow and sunny areas), and the like when image capturing is being performed. For example, adjustment parameters for adjusting the standard exposure condition (for example, values by which exposure time, exposure sensitivity, or the like is to be multiplied) can be set in advance in accordance with the environment information.

For example, the environment information is referred to at an imaging timing, and adjustment parameters corresponding to the environment information are acquired. Exposure conditions causing a smaller exposure amount or a larger exposure amount than that of the standard exposure condition, and the like can be appropriately set on the basis of the adjustment parameters. In such a manner, the imaging control unit 42 can set other exposure conditions different from the standard exposure condition on the basis of the environment information regarding the surrounding environment of the vehicle 10, with the standard exposure condition as the standard. This makes it possible to easily set a plurality of exposure conditions different from each other.

Further, other methods of setting the exposure conditions include a method of using default adjustment parameters for the standard exposure condition. For example, first patterns (0.5T, 1.0T, 2.0T) of an exposure time T, which are obtained by respectively multiplying the exposure time T under the standard exposure condition by 0.5, 1.0, and 2.0, are set. Further, for example, second patterns (0.5T, 1.0T, 2.0T) of the exposure time T, which are obtained by respectively multiplying the exposure time T by 0.3, 1.0, and 3.0, are set. Note that the exposure time of 1.0T corresponds to the standard exposure condition (standard surrounding image 50a). As a matter of course, a pattern of an exposure sensitivity S may be set.

The feature points 60 are extracted from each of the three surrounding images 50 captured in the first patterns, and evaluation values of the first patterns are calculated from the number, the distribution, and the like of the feature points 60. For example, as the number of extracted feature points 60 is larger and as the feature points 60 are less unevenly detected from the entire image, the evaluation value increases. Similarly, the feature points 60 are extracted from each of the three surrounding images 50 captured in the second patterns, and evaluation values of the second patterns are calculated. The evaluation values of the first and second patterns are compared with each other, and a plurality of subsequent exposure conditions (other exposure conditions different from standard exposure condition) is set on the basis of the pattern having larger evaluation values. In such a manner, a method of setting a plurality of exposure conditions by testing the patterns having the plurality of parameters may be used.

Note that imaging timings or the like by other exposure conditions are also set in Step 105. The method of setting an imaging timing under each exposure condition will be described later in detail. Hereinafter, the first exposure condition and the second exposure condition described with reference to FIG. 10 are assumed to be set as other exposure conditions.

Referring back to FIG. 8, surrounding images 50 captured under the first and second exposure conditions set in Step 105 are acquired, and feature points 60/feature quantities are extracted from each of the surrounding images 50 (Step 106). Image capturing of each surrounding image 50 is sequentially executed at a timing set by the imaging control unit 42. FIG. 9 schematically illustrates the image capturing executed under the first exposure condition and the second exposure condition (other exposure conditions) by the imaging device 20.

FIGS. 11A and 11B is a schematic diagram illustrating an example of the surrounding images 50 captured under other exposure conditions. FIGS. 11A and 11B are schematic diagrams illustrating surrounding images 50b and 50c captured under the first exposure condition and the second exposure condition described in FIG. 10.

As illustrated in FIG. 11A, in the surrounding image 50b captured under the first exposure condition, the background (sky) is sufficiently bright with respect to the exterior wall of the building, and the shape of the balcony 52 or the like of the building is clear. The process of extracting the feature points 60 is executed for the surrounding image 50b captured under the first exposure condition, and the feature point 60 corresponding to the shape of the balcony 52 or the like of the building is extracted.

Further, as illustrated in FIG. 11, in the surrounding image 50c captured under the second exposure condition, the contrast of a pole 54 or the like on the roadside with respect to the ground such as the road is high, and the shape of the pole 54 or the like is clear. The process of extracting the feature points 60 is executed for the surrounding image 50c captured under the second exposure condition, and the feature point 60 corresponding to the shape of the pole 54 or the like is extracted.

In such a manner, there is a possibility that the feature points 60 that are not extracted from the standard surrounding image 50a are extracted from the surrounding images 50b and 50c captured under the first and second exposure conditions. In other words, use of the plurality of exposure conditions different from each other allows the feature points 60 to be uniformly extracted from nearly identical scenery.

A matching process (second matching process) between the surrounding images 50b and 50c captured under other exposure conditions and the plurality of pieces of reference information 31 is executed (Step 107). In the second matching process, reference information 31 having a highest degree of similarity with a plurality of surrounding images 50 (standard surrounding image 50a, surrounding image 50b, and surrounding image 50c) captured under changed exposure conditions is selected from among the plurality of pieces of reference information 31.

Figure 12:
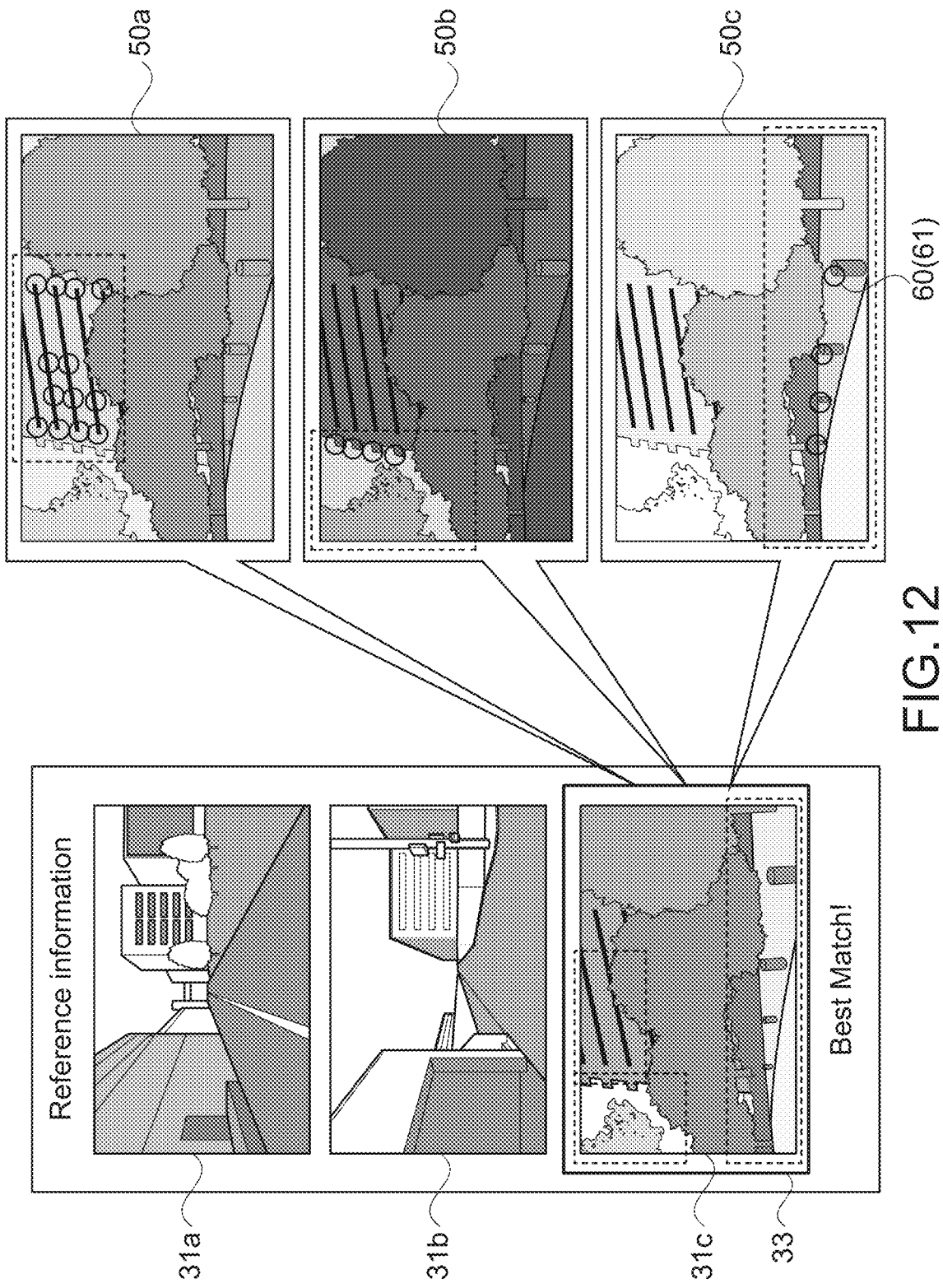
FIG. 12 is a schematic diagram for describing the general outline of a second matching process.

FIG. 12 is a schematic diagram for describing the general outline of the second matching process. In the example illustrated in FIG. 12, a matching process between a plurality of pieces of reference information 31a to 31c acquired by the acquisition unit 40 and the surrounding image 50b captured under the first exposure condition is executed. Further, a matching process between the plurality of pieces of reference information 31a to c and the surrounding image 50c captured under the second exposure condition is executed.

For example, in the matching process between the reference information 31c and the surrounding image 50b captured under the first exposure condition, the feature points 60 extracted from the shape of the balcony 52 or the like of the building are calculated as a pair having a high matching rate. Further, in the matching process between the reference information 31c and the surrounding image 50c captured under the second exposure condition, the feature points 60 extracted from the shape of the pole 54 or the like of the roadside are calculated as a pair having a high matching rate.

Note that the feature points 60 extracted from the shape of the window 51 or the like of the building have been already calculated as a pair having a high matching rate by the first matching process between the reference information 31c and the standard surrounding image 50a executed in Step 102. In FIG. 12, regions calculated as a pair having a high matching rate in the standard surrounding image 50a, the surrounding image 50b, and the surrounding image 50c are schematically illustrated in dotted lines.

Therefore, as shown in FIG. 12, in the matching with the reference information 31c, the feature points 60 (pairs) to be matched are calculated on the entire image of the reference information 31c. In such a manner, the execution of the second matching process makes it possible to highly accurately select the reference information 31 (reference information 31c), which is the most similar to the plurality of surrounding images (standard surrounding image 50a, surrounding image 50b, and surrounding image 50c) captured under the plurality of different exposure conditions. Hereinafter, the reference information 31, which is the most similar to the plurality of surrounding images 50, will be described as estimation reference information 33. Therefore, in FIG. 12, the reference information 31c is the estimation reference information 33.

Note that, in the description above, all of the plurality of pieces of reference information 31 acquired by the acquisition unit 40 is subjected to the second matching process, but the present technology is not limited thereto. For example, the reference information 31 to be subjected to the second matching process may be appropriately determined on the basis of a process result of the first matching process in Step 102, a process result due to the first threshold in the Step 103, and the like. This allows the reference information 31 or the like, which is determined to be similar to the standard surrounding image 50a to some extent, to be set as a target for the second matching process, for example. This allows the throughput of the second matching process to be suppressed.

Referring back to FIG. 8, an estimation feature point 61 to be used for estimating the location/posture information of the vehicle 10 is selected on the basis of a result of the matching with the estimation reference information 33 (Step 108). For selection of the estimation feature point 61, for example, the feature point 60 or the like having a matching rate larger than a predetermined threshold is appropriately selected from the feature points 60 of each surrounding image 50 matched with the estimation reference information 33.

This makes it possible to eliminate the feature point 60 or the like having a low matching rate, for example. As a result, it is possible to use the feature point 60 having a high matching rate (matching score) in the process of estimating the location/posture information of the vehicle 10. Note that the predetermined threshold is appropriately set so as to allow the self location estimation process with desired accuracy, for example. Besides, the method of selecting the estimation feature point 61 or the like is not limited.

It is determined whether the number of selected estimation feature points 61 is equal to or larger than a given number (Step 109). In other words, it can also be said that whether or not a sufficient amount of feature points 60 is matched with the estimation reference information 33 is determined.

In a case where the number of estimation feature points 61 is a certain number or less (No in Step 109), it is possible that the matching accuracy with the estimation reference information 33 is low or that false estimation reference information 33 is selected. In this case, Step 111 is executed, and the process of Step 101 and the following processes are repeated.

In a case where the number of estimation feature points 61 is a certain number or less (No in Step 109), it is determined that the estimation reference information 33 is properly selected and the matching with sufficient accuracy is performed, and the estimation process unit 46 executes the process of estimating the location/posture information of the vehicle 10 (Step 110).

The estimation process unit 46 estimates the location and the posture (location/posture information) of the vehicle 10 on the basis of location information (two-dimensional location within image) of the estimation feature point 61 selected in Step 108 and location information (three-dimensional coordinates in map coordinate system) of the feature point 60 of the estimation reference information 33.

For example, a matrix that converts the location information of the estimation feature point 61 into location information of the paired feature point 60 of the estimation reference information is appropriately calculated. An optimization process or the like is executed on the matrix, and a matrix capable of properly converting all of the estimation feature points 61 into three-dimensional coordinates is searched for. A location at which the estimation feature point 61 is detected, that is, location information (latitude and longitude) of the imaging spot 21 at which the surrounding image 50 is captured, is estimated on the basis of the optimized matrix.

Note that, as described with reference to FIG. 4, each of the plurality of surrounding images 50 has the identical imaging spot 21. In this embodiment, a process of correcting the shift of the imaging spot 21, a change in posture of the vehicle 10, and the like associated with the movement of the vehicle 10 is appropriately executed.

For example, using an inertial measurement unit (IMU), a gyro sensor, or the like installed in the vehicle 10, a change amount of a pose (location/posture) of the vehicle 10 or the like at short time intervals is detected. A relative pose of the imaging device 20 (vehicle 10) obtained when each surrounding image 50 is captured is calculated on the basis of the detected change amount of the pose of the vehicle 10. Use of the relative pose makes it possible to appropriately correct a location or the like of the feature point 60 extracted from each surrounding image 50.

The estimation process unit 46 estimates, as the location information of the vehicle 10, information on latitude and longitude of the imaging spot 21 at which the latest surrounding image 50 is captured (in the example of FIG. 4, imaging spot 21c) in the map coordinate system, for example. Further, the imaging direction of the imaging device 20 at the imaging spot 21, that is, the orientation or the like of the vehicle 10 is estimated as a posture of the vehicle 10. Of course, the location/posture or the like of the vehicle 10 at another imaging spot 21 may be estimated.

Use of the estimation feature point 61 having a high matching rate in the process of estimating the location/posture information of the vehicle 10 makes it possible to suppress errors associated with the matching process, use of mismatched feature points 60, and the like and to dramatically improve the accuracy of the estimation process. As a result, the location or posture of the vehicle 10 can be estimated with sufficiently high accuracy.

When the location/posture information of the vehicle 10 is estimated, a preparation for capturing the next standard surrounding image 50a is executed by Step 111, and the process of Step 101 and the following steps are repeated.

Figure 13:
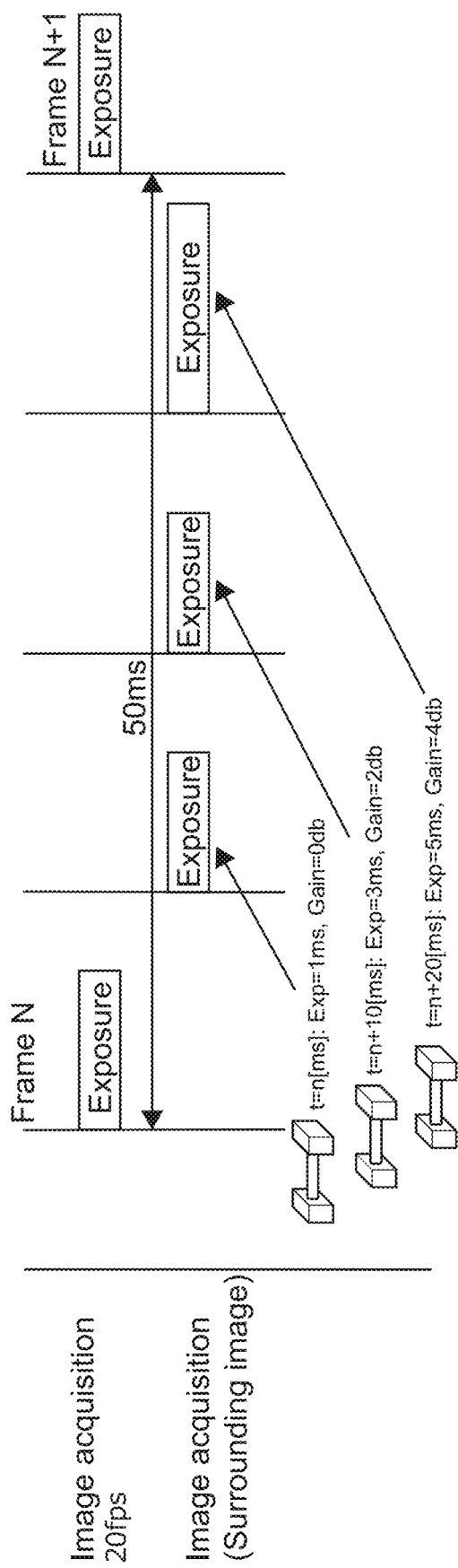
FIG. 13 is a schematic diagram illustrating an example of imaging timings under the plurality of exposure conditions.

FIG. 13 is a schematic diagram illustrating an example of imaging timings under a plurality of exposure conditions. FIG. 13 schematically illustrates each imaging timing (t) performed by the imaging device 20 and an exposure time in each image capturing.

In the example of FIG. 13, an image capturing process at a rate of 20 fps (frame/sec) under a predetermined exposure condition is executed. An image captured at a rate of 20 fps is used in, for example, a detection process or a tracking process for an obstacle (another vehicle, pedestrian, or the like) or the like around the vehicle 10.

Further, the image capturing for the plurality of surrounding images 50 under different exposure conditions is appropriately executed during the image capturing at the rate of 20 fps (50 ms). In FIG. 13, three times of image capturing in which an exposure time (Exp) and an exposure sensitivity (Gain) are different are appropriately executed so as not to overlap the image capturing at the rate of 20 fps. In such a manner, the imaging control unit 42 separates the timings of the image capturing of the plurality of surrounding images 50 from the timings of the image capturing of other images different from the plurality of surrounding images 50.

Separating the timings of the image capturing with the frame rate as a standard makes it possible to sufficiently suppress an impact on, for example, another process or the like using images. In other words, it is possible to avoid false detection, a behavior failure, and the like due to use of the surrounding images 50 having different exposure conditions in another process. As a result, the reliability of the apparatus can be improved.

Figure 14:
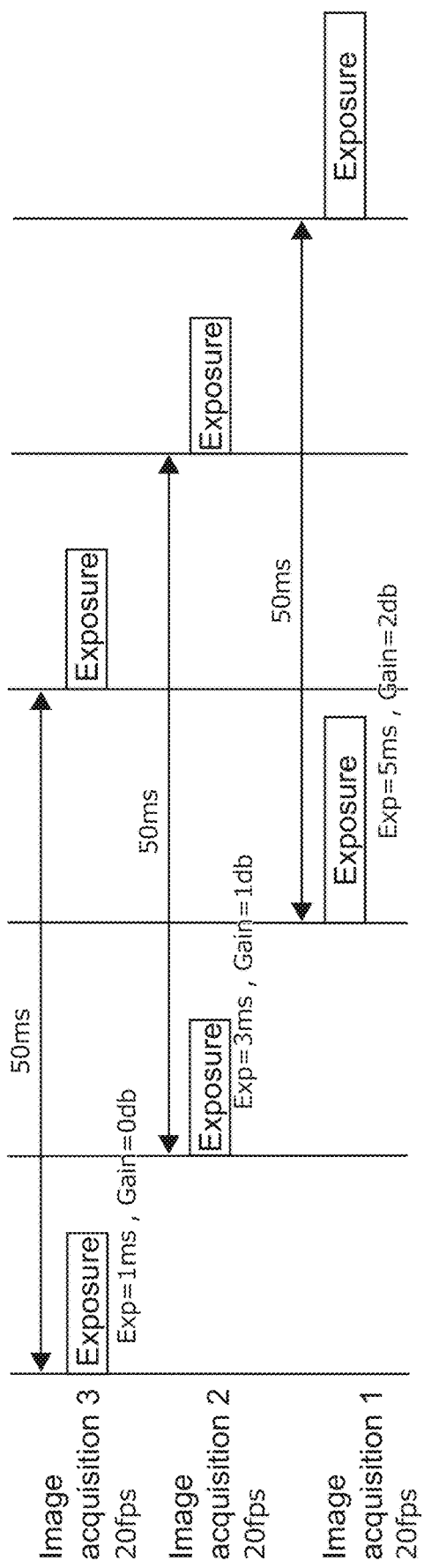
FIG. 14 is a schematic diagram illustrating another example of the imaging timings under the plurality of exposure conditions.

FIG. 14 is a schematic diagram illustrating another example of the imaging timings under the plurality of exposure conditions. In FIG. 14, three times of image capturing in which an exposure time and an exposure sensitivity are different are repeatedly executed at regular time intervals in ascending order of the exposure time. For example, the image capturing in the shortest exposure time is executed at the intervals of 50 ms, that is, at a rate of 20 fps. Similarly, the image capturing in the middle exposure time and the image capturing in the longest exposure time are also executed at a rate of 20 fps. In this case, three times of image capturing in the three kinds of exposure times are repeated at the intervals of 60 fps.

In such a manner, the imaging control unit 42 sets a timing of the image capturing of each of the plurality of surrounding images 50 to be a regular interval. Thus, for example, the surrounding image 50 captured in the middle exposure time can be acquired at the rate of 20 fps. For example, another process may be executed using such a surrounding image 50. Further, a plurality of self location estimation processes may be executed in parallel on the basis of the images having different exposures. In such a manner, matching the imaging timings allows an impact on another process or the like to be sufficiently suppressed.

Hereinabove, the autonomous driving control unit 112 according to this embodiment captures a plurality of surrounding images 50 from the identical imaging spot in order to estimate the location/posture information including at least one of the location or the posture of the vehicle 10. The plurality of surrounding images 50 is captured under a plurality of different exposure conditions and used in a process regarding the estimation of the location/posture information. In such a manner, use of the plurality of surrounding images 50 having different exposure conditions makes it possible to highly accurately estimate the location or the posture of the vehicle 10.

For the method of estimating the self location of a vehicle, a method of estimating a self location by image matching between a single image captured from a vehicle and an image to be a reference target is conceivable. In this method, for example, in a case where a time period during which an image to be a reference target is captured and a time period during which an image is captured from the vehicle are different, the accuracy of the image matching may be reduced due to a difference in the way of falling of the shadow, the reflection of the sunlight, the brightness of the surrounding, or the like. For example, there is a possibility of causing a problem that the estimation accuracy of a self location is not obtained or matching is not established due to the small number of feature points matched in the respective images.

Figure 15A:
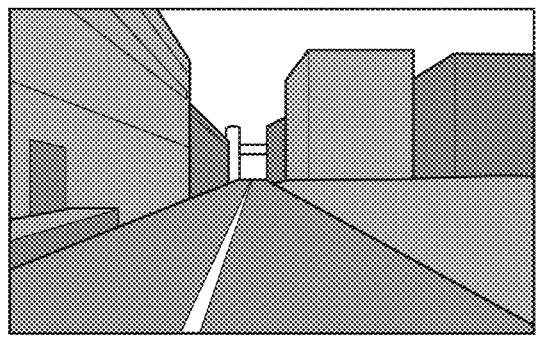
FIGS. 15A, 15B, and 15C are schematic diagrams illustrating examples of image matching as a comparative example.
Figure 15B:
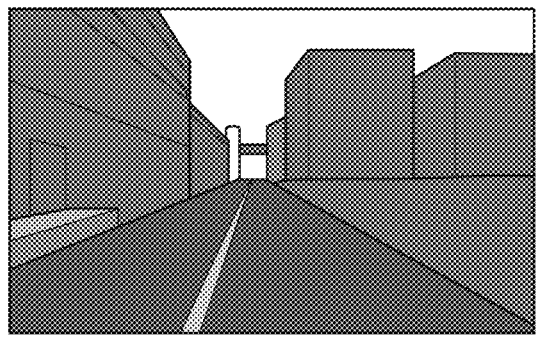
Figure 15C:
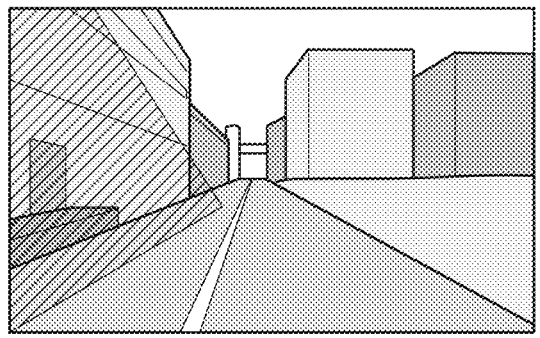

FIGS. 15A, 15B, and 15C are schematic diagrams illustrating examples of image matching as a comparative example. FIG. 15A is a schematic diagram illustrating an example of an image to be a reference target. FIGS. 15B and 15C are schematic diagrams illustrating examples of images captured from a vehicle in the evening and the morning.

For example, FIG. 15B has a large area of shadow due to buildings and the like because the time period during which the image capturing was performed is in the evening, and the contrast on the image plane is reduced. As a result, the number of feature quantities to be detected is reduced, and there is a possibility that the accuracy of the image matching with the image to be the reference target shown in FIG. 15A is reduced. Further, for example, in FIG. 15C, a long shadow or the like falls, and thus feature points of a structure such as a building are difficult to partially extract. Also in such a case, the number of feature quantities to be matched or the like is reduced, and the accuracy of the image matching may be reduced.

Note that, in order to improve the accuracy of the image matching or the like, a method of capturing images to be reference targets in different time periods at a similar location is conceivable. This method needs to execute image capturing at each point while changing the time period and may involve cost for establishment or maintenance of a database. Further, the capacity necessary for the database may increase and the speed of a retrieval process may slow down.

The acquisition unit 40 according to this embodiment can acquire a plurality of surrounding images 50 captured from the identical imaging spot under a plurality of different exposure conditions. Thus, for example, the feature points 60 corresponding to respective exposure states of different regions within the image can be detected from each surrounding image. For example, in a case where the number of detected feature points 60 is small in a certain region of the surrounding image 50, the feature points 60 detected in another surrounding image 50 can be used to correct the extraction amount of the feature points 60, variations, or the like.

As a result, for example, estimation reference information or the like to be used in the self location estimation process can be accurately selected from the reference information database 30. Further, use of the feature points 60 extracted from each of the plurality of reference images 32 makes it possible to execute the matching process for the feature points 60 in the entire image plane of the reference information. As a result, the accuracy of the matching process can be significantly improved.

Further, since the surrounding images 50 are captured under different exposure conditions, in a case where the images are seen in different ways due to the reflection, the falling of the shadow, or the like, the feature points 60 can be sufficiently extracted. This makes it possible to sufficiently maintain the matching accuracy even in a case where the matching process with the reference image 32 captured in a different time period or the like is performed.

Further, in this embodiment, the estimation feature point 61 for estimating the location/posture information of the vehicle 10 is selected on the basis of the matching result of the matching process. This allows the estimation process to be executed using the feature points 60 matched with high accuracy and allows the location or the posture of the vehicle 10 to be estimated with sufficient accuracy.

In such a manner, appropriately changing the exposure conditions or the like allows the image capturing state of the surrounding image 50, which is acquired on the vehicle side, to be easily adjusted. Therefore, highly accurate self location estimation can be achieved at low cost without increasing the cost, capacity, or the like for establishing the reference information database 30.

Second Embodiment

A reference information registration apparatus according to a second embodiment of the present technology will be described. In the following description, description on the configurations and effects similar to those in the self location estimation unit described in the above embodiment will be omitted or simplified.

Figure 16:
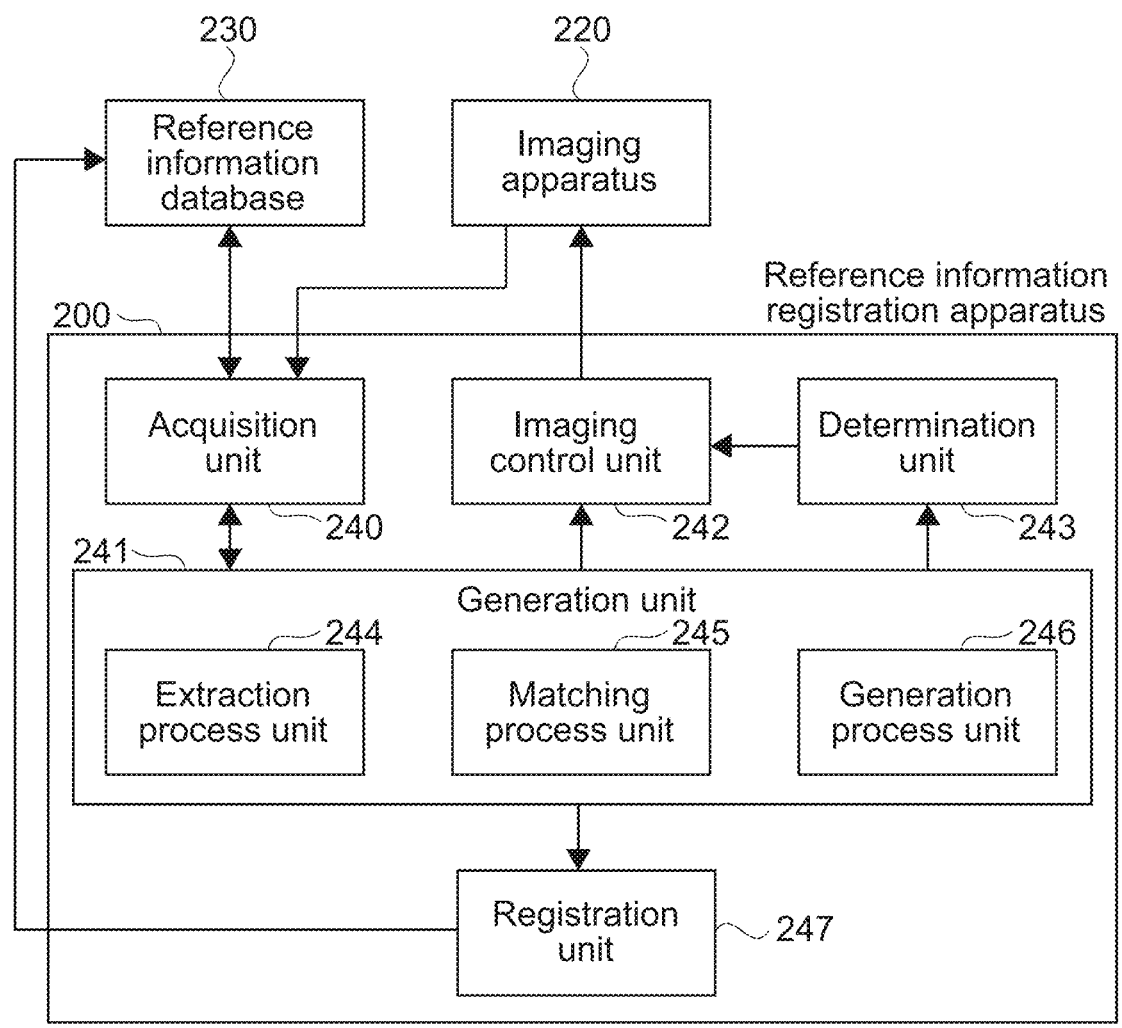
FIG. 16 is a block diagram illustrating a configuration example of a reference information registration apparatus according to a second embodiment.

FIG. 16 is a block diagram illustrating a configuration example of the reference information registration apparatus according to the second embodiment. In this embodiment, a reference information registration apparatus 200 is installed in a vehicle for map generation. Further, an imaging apparatus 220 is installed in the vehicle for map generation. For example, the reference information registration apparatus 200 generates reference information by using the imaging apparatus 220 and registers the generated reference information in a reference information database 230. The reference information registration apparatus 200 functions as an information processing apparatus according to this embodiment.

The reference information registered in the reference information database 230 is referred to by another vehicle and is used in a self location estimation process or the like for another vehicle. Hereinafter, a vehicle that performs a self location estimation process by referring to the reference information will be described as an estimation target vehicle. Note that the vehicle for map generation may be an estimation target vehicle. In this embodiment, the estimation target vehicle is an example of a mobile object.

As illustrated in FIG. 16, the reference information registration apparatus 200 includes an acquisition unit 240, a generation unit 241, an imaging control unit 242, a determination unit 243, and a registration unit 247.

The acquisition unit 240 acquires an image of the surrounding of the vehicle for map generation, which is captured by the imaging apparatus 220. The image of the surrounding of the vehicle for map generation is used as a reference image for generating reference information. Hereinafter, the image captured by the imaging apparatus 220 will be described as a reference image. In this embodiment, the reference image corresponds to an estimation image.

In the vehicle for map generation, images of the surrounding of the vehicle for map generation are captured by the imaging apparatus 220 from the identical imaging spot under a plurality of different exposure conditions. Therefore, the acquisition unit 240 acquires a plurality of reference images captured from the identical imaging spot under a plurality of different exposure conditions.

Further, the acquisition unit 240 can acquire location information of the identical imaging spot at which the reference images are captured. Here, the location information of the imaging spot is location information in a map coordinate system, for example, information on latitude and longitude of the imaging spot. The location information of the imaging spot is acquired for each of the plurality of reference images. Therefore, the acquisition unit 240 can acquire the location information of the identical imaging spot at which the plurality of reference images is captured.

The location information of the imaging spot is detected on the basis of, for example, a GNSS signal received by a GPS sensor installed in the vehicle for map generation, SLAM performed by the vehicle for map generation, or the like. The method of detecting the location information of the imaging spot or the like is not limited and, for example, any method capable of detecting the location information of the imaging spot at desired accuracy may be appropriately used.

The generation unit 241 generates reference information for estimating a location and a posture (location/posture information) of the estimation target vehicle on the basis of the plurality of reference images. Hereinafter, the process of generating the reference information will be described as a reference information generation process. In this embodiment, the reference information generation process corresponds to a process regarding the estimation of mobile object information, and the generation unit 241 corresponds to an execution unit.

In this embodiment, the reference information generation process is executed using the location information of the identical imaging spot at which the plurality of pieces of reference information is captured. In other words, it can also be said that the generation unit 241 generates reference information for estimating a location and a posture of the estimation target vehicle on the basis of the plurality of reference images and the location information of the identical imaging spot.

As illustrated in FIG. 16, the generation unit 241 includes an extraction process unit 244, a matching process unit 245, and a generation process unit 246.

The extraction process unit 244 extracts feature points from the reference image. At that time, a feature quantity for each of the feature points is calculated. Feature point information regarding the feature points is calculated on the basis of the feature points and the feature quantities. The feature point information is configured by, for example, a parameter for evaluating the feature points extracted from a certain reference image. The feature point information will be described later in detail.

The feature point extraction process is executed for each of the plurality of reference images. Further, the feature point information is calculated for each reference image. In such a manner, the extraction process unit 244 extracts feature points of each of the plurality of reference images and calculates feature point information regarding the extracted feature points.

Further, the extraction process unit 244 selects a feature point for estimating the location/posture information of the estimation target vehicle on the basis of the feature point information. Hereinafter, the selected feature point will be described as a reference feature point in some cases.

The matching process unit 245 executes a matching process between the reference image acquired by the acquisition unit 240 and the reference information already registered, and determines whether or not there is reference information similar to the acquired reference image. Hereinafter, reference information, a reference image, and a feature point already registered in the reference information database 230 will be described as registered reference information, a registered reference image, and a registered feature point in some cases.

The generation process unit 246 generates reference information. Specifically, location information of a feature point included in a reference image is calculated from the location information of an imaging spot at which the reference image is captured, and reference information including the location information of the feature point is appropriately generated. In such a manner, in this embodiment, the location information of the reference feature point is calculated on the basis of the location information of the identical imaging spot. The reference information including the location information of the reference feature point is then generated.

The imaging control unit 242 controls image capturing of the reference image by the imaging apparatus 220. The determination unit 243 determines whether image capturing under changed exposure conditions is necessary or not. The registration unit 247 registers the reference information generated by the generation unit 241 in the reference information database 230. For example, the generated reference information is appropriately uploaded to the reference information database 230, and thus a reference information registration process is performed.

Figure 17:
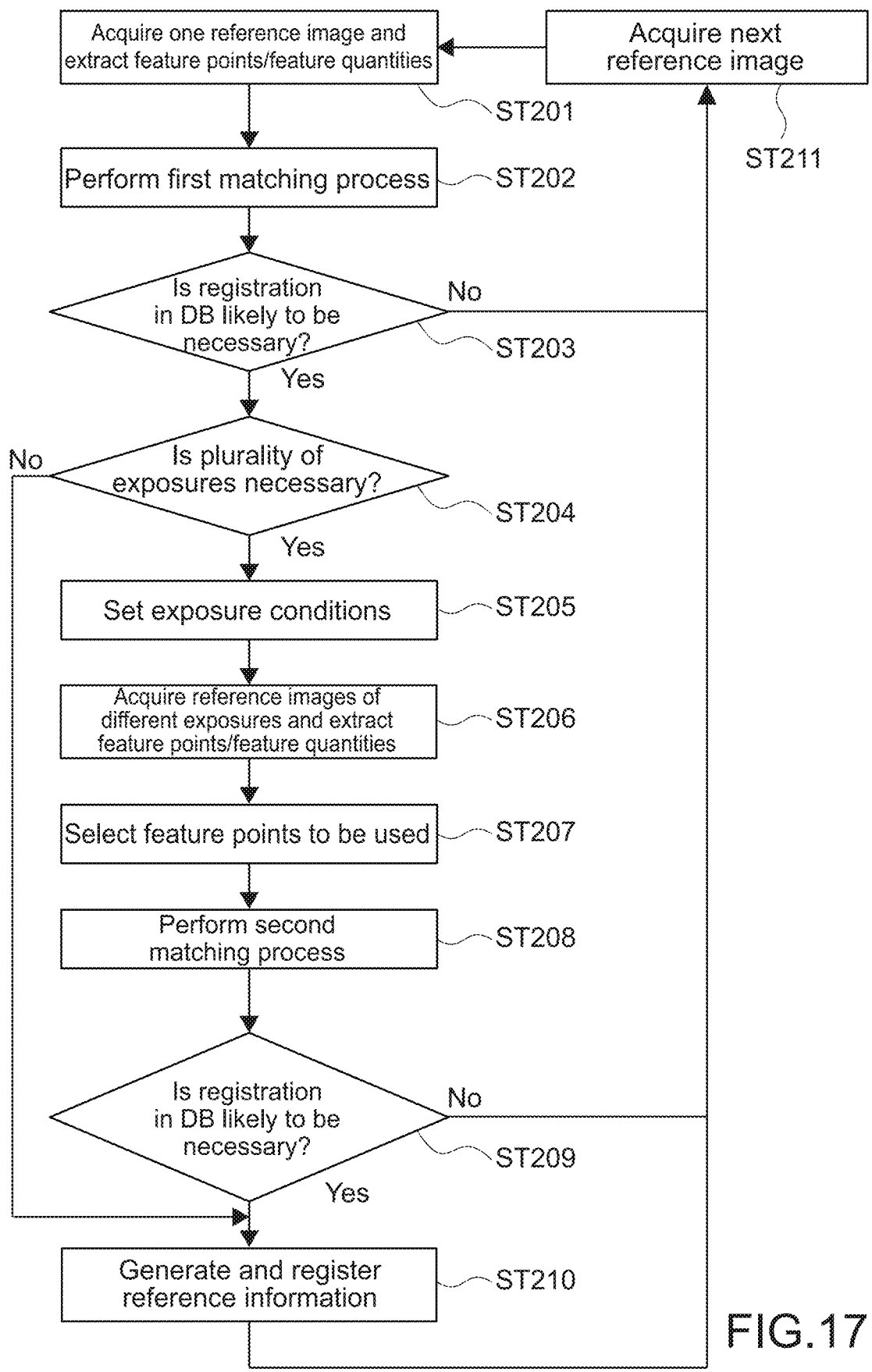
FIG. 17 is a flowchart illustrating an example of a reference information generation process.
Figure 18:
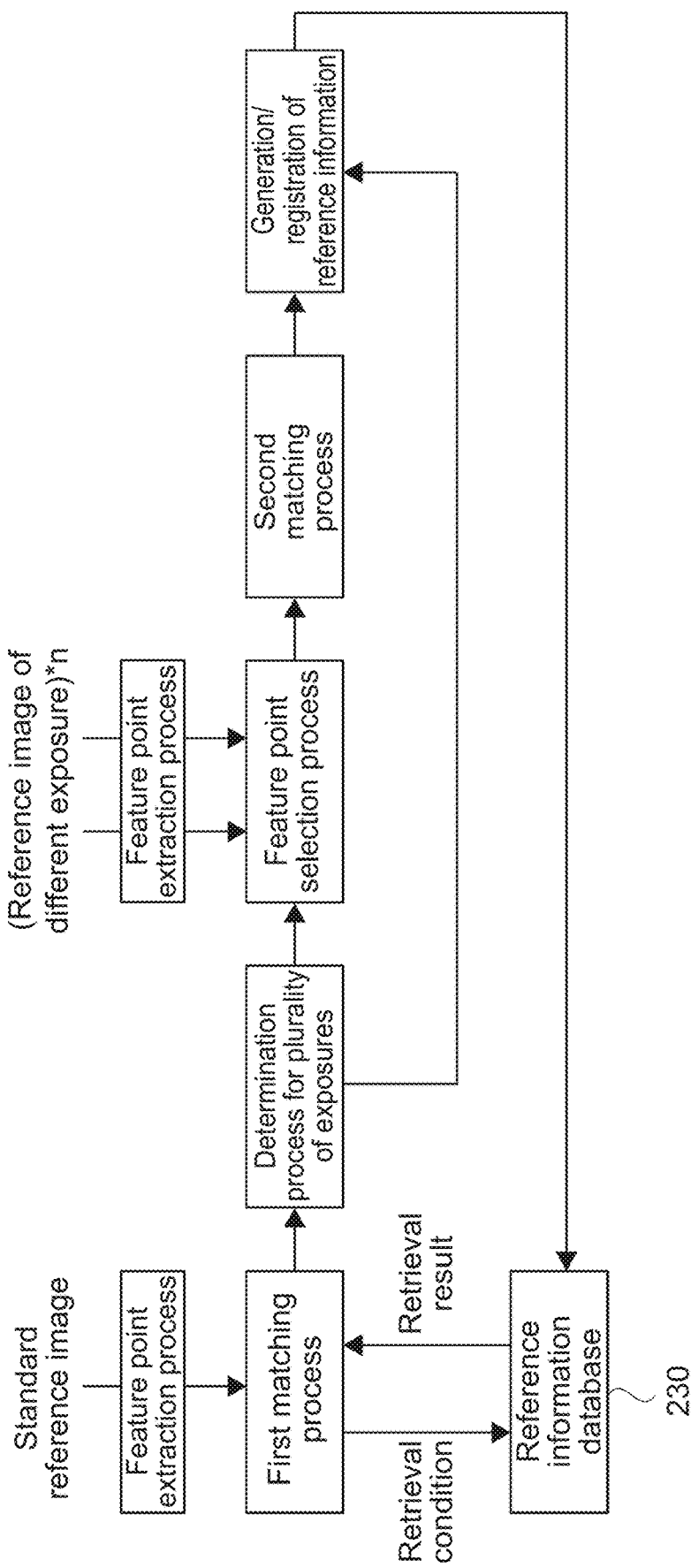
FIG. 18 is a schematic diagram illustrating an example of an internal process executed in the reference information generation process illustrated in FIG. 17.

FIG. 17 is a flowchart illustrating an example the reference information generation process. FIG. 18 is a schematic diagram illustrating an example of an internal process executed in the reference information generation process of FIG. 17. Hereinafter, an example of the reference information generation process will be specifically described with reference to FIGS. 17 and 18.

As illustrated in FIG. 17, first, a reference image (standard reference image) is captured under a standard exposure condition, and feature points/feature quantities are extracted (Step 201). At that time, feature point information is simultaneously calculated. For the standard reference image, a matching process with a plurality of pieces of registered reference information (first matching process) is executed, and results of the matching with the respective pieces of registered reference information are calculated (Step 202). Note that, as illustrated in FIG. 18, the plurality of pieces of registered reference information is appropriately acquired from the reference information database 230 on the basis of a predetermined retrieval condition.

It is determined whether the registered reference information including a feature point similar to the feature point of the standard reference image is already present or not (Step 203). In other words, determination on whether it is likely to need to register the reference information generated from the standard reference image or the like in the reference information database 230 is executed. For example, in a case where the registered reference information sufficiently matched with the feature point of the standard reference image is present (No in Step 203), it is determined that the reference information to be generated does not need to be registered, and a preparation for acquiring the next reference image is started (Step 211).

On the other hand, in a case where the registered reference information sufficiently matched with the feature point of the standard reference image is not present, it is determined that registration is likely to be necessary (Yes in Step 203). For example, this is the case where all of the degrees of similarity with the plurality of pieces of registered reference information are equal to or smaller than a threshold.

If it is determined that registration is necessary, other exposure conditions other than the standard exposure condition are set (Step 205). Other exposure conditions are set by, for example, the method described with reference to FIGS. 10, 11A, and 11B and the like. Hereinafter, a first exposure condition in which the exposure amount is smaller than that of the standard exposure condition and a second exposure condition in which the exposure amount is larger than that of the standard exposure condition are set.

Images of the surrounding of the vehicle for map generation are captured under the other exposure conditions, and reference images having different exposures are acquired. Feature points/feature quantities are then extracted from each of the reference images (Step 206). At that time, the feature point information on each of the reference images having different exposures is calculated.

Figure 19A:
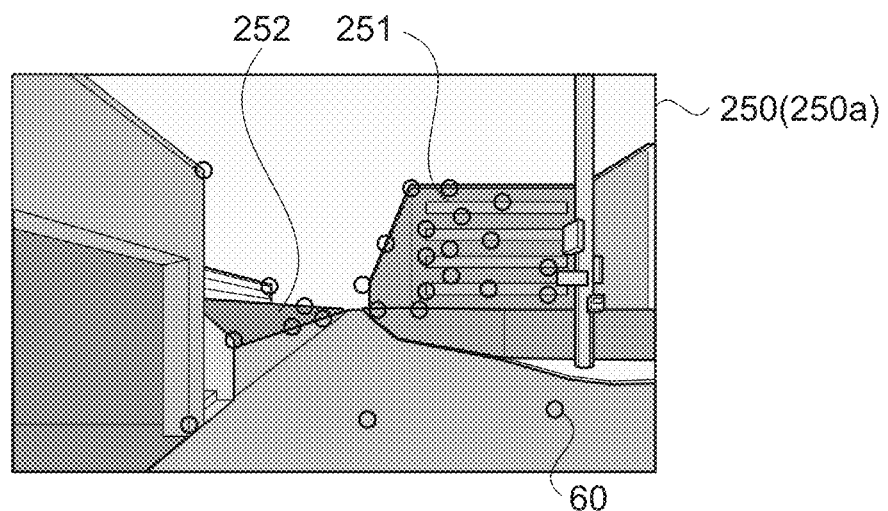
FIGS. 19A, 19B, and 19C are schematic diagrams for describing examples of a process of selecting reference feature points.
Figure 19B:
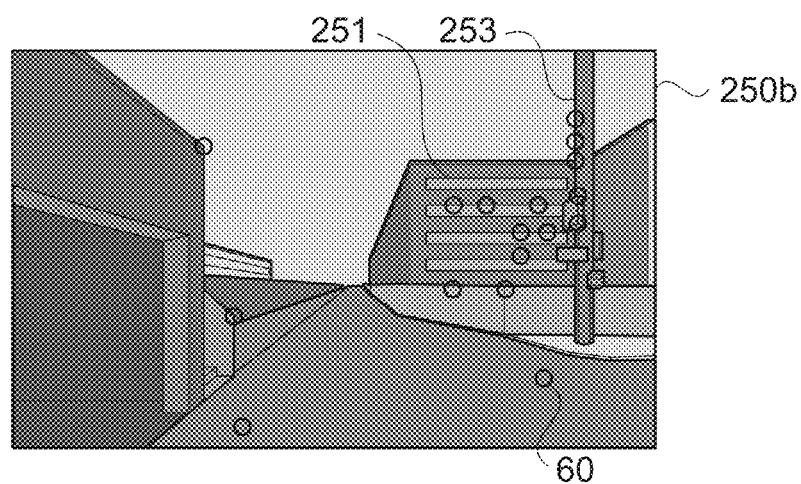
Figure 19C:
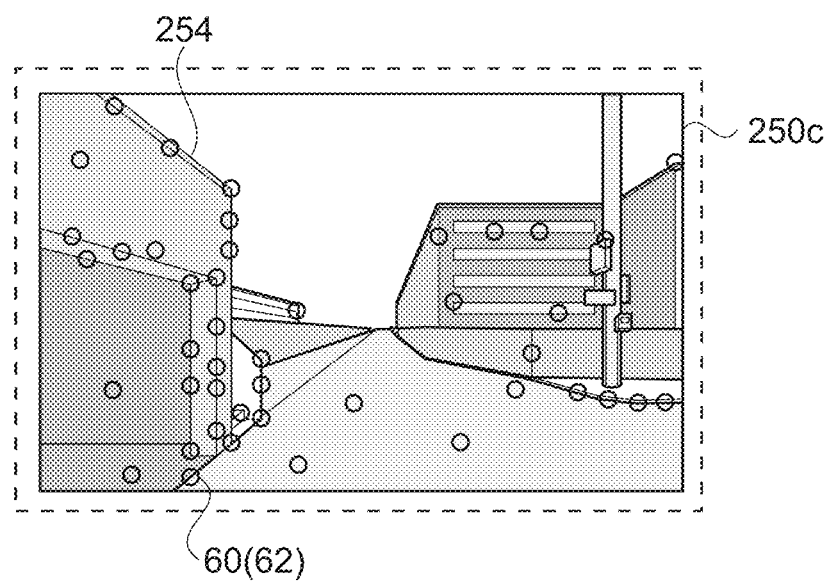

A reference feature point for generating the reference information is selected on the basis of the feature point information (Step 206). FIGS. 19A, 19B, and 19C are schematic diagrams for describing examples of the process of selecting the reference feature points. FIG. 19A is a schematic diagram illustrating an example of a standard reference image 250a captured under the standard exposure condition. FIG. 19B is a schematic diagram illustrating an example of a reference image 250b captured under the first exposure condition. FIG. 19C is a schematic diagram illustrating an example of a reference image 250c captured under the second exposure condition.

In the examples illustrated in FIGS. 19A, 19B, and 19C, among the reference images 250, the feature points 60 of one reference image 250 are extracted as reference feature points 62 on the basis of the feature point information of the respective reference images 250. Note that FIGS. 19A, 19B, and 19C schematically illustrates the feature points 62 extracted from each reference image by circles.

In this embodiment, the feature point information includes information such as the number of feature points 62, the distribution of the feature points 62, and the extraction accuracy of the feature points 62. As a matter of course, the present technology is not limited to the above, and another parameter regarding the feature point 62 or the like may be appropriately set as feature point information.

For example, an extraction score of the feature point 62 in the image can be calculated in accordance with the number of feature points 62, the distribution of the feature points 62, and the extraction accuracy of the feature points 62. For example, as the number of feature points 62 becomes larger or as the extraction accuracy of each feature point 62 becomes higher, the extraction score has a higher value. Further, as the feature points 62 are distributed more evenly on the entire image plane, a higher feature point is set. In such a manner, an extraction score corresponding to the state of the feature point 62 extracted from the reference image 250 is appropriately calculated. Use of the extraction score allows an image, in which the feature points 62 are best extracted, to be selected, for example.

In FIG. 19A, feature points are extracted from a window 251 of a building, a bank 252 on the roadside, and the like. In FIG. 19B, feature points are extracted mainly from the window 251 of the building, a telephone pole 253, and the like. Meanwhile, the number of feature points 60 is small as a whole, and the feature points 60 are concentrated around the window 251 of the building and the telephone pole 253. In other words, those are images having a large deviation in the distribution of the feature points 62. Further, in FIG. 19C, feature points are extracted from the entire image plane including a garage 254, a road, and the building, and the feature points are evenly distributed.

The extraction process unit 244 calculates an extraction score of each of the standard reference image 250a, the reference image 250b, and the reference image 250c on the basis of the feature point information. The feature points 62 of the reference image 250 with a highest extraction score are then selected as the reference feature points 62. In the examples illustrated in FIGS. 19A, 19B, and 19C, the reference image 250c captured under the second exposure condition illustrated in FIG. 19C has a highest extraction score, and the feature points 62 extracted from the reference image 250c are selected as the reference feature points 62.

Figure 20A:
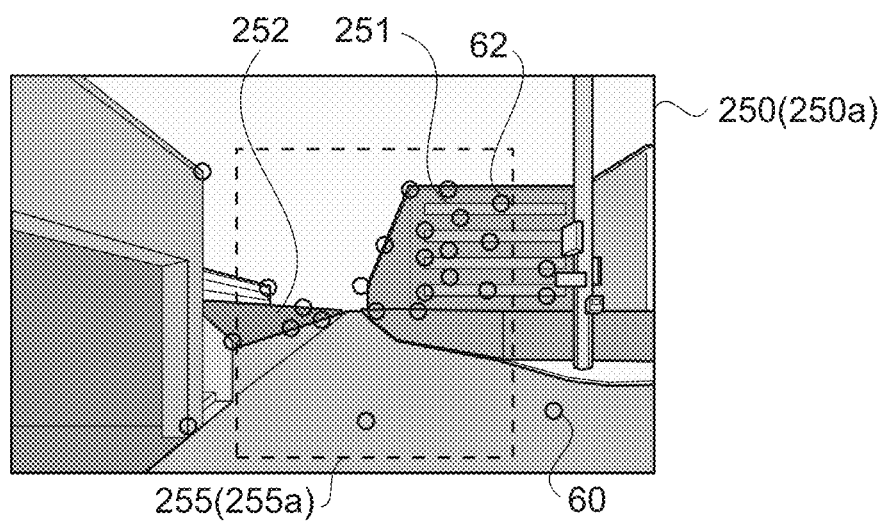
FIGS. 20A, 20B, and 20C are schematic diagrams for describing other examples of the process of selecting reference feature points.
Figure 20B:
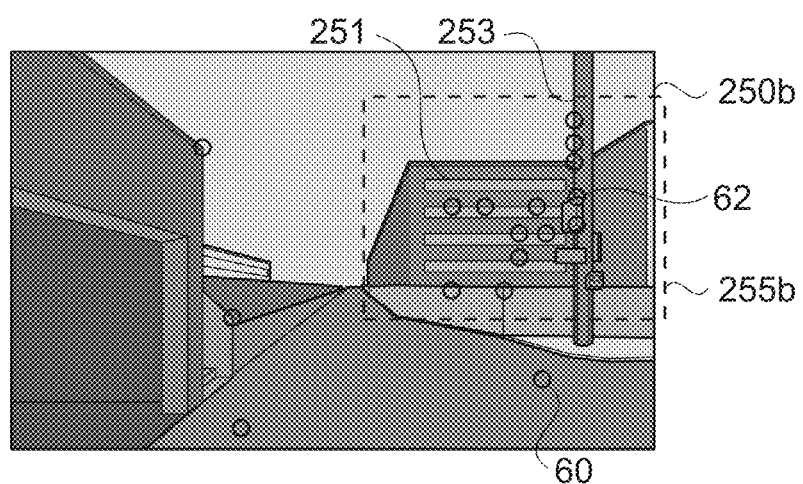
Figure 20C:
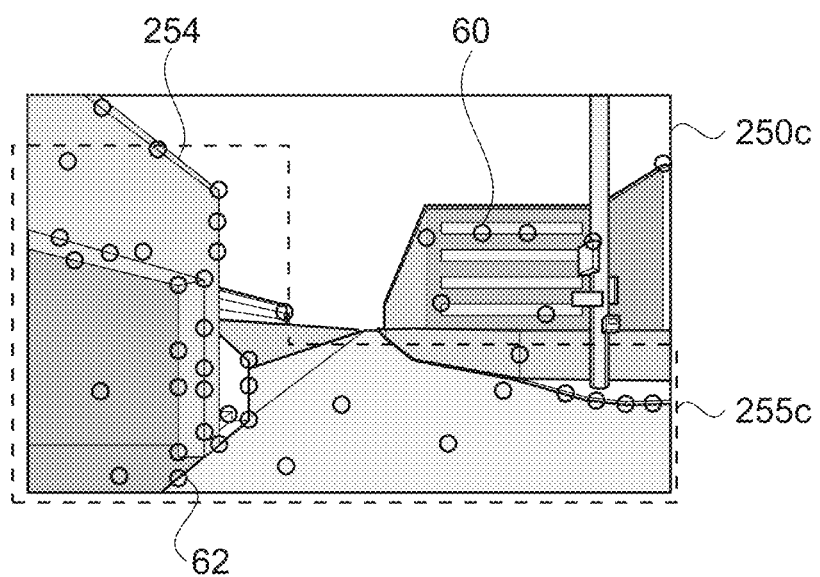

FIGS. 20A, 20B, and 20C are schematic diagrams for describing other examples of the process of selecting the reference feature points. Reference images 250 illustrated in FIGS. 20A, 20B, and 20C are images similar to the reference images 250 of FIGS. 19A and 19B. In FIGS. 20A, 20B, and 20C, partial regions 255 each including the feature points 62 are cut out from the respective reference images 250 such that the feature points 62 are evenly distributed on the entire image plane.

For example, in FIG. 20A, a partial region 255a including the window 251 of the building, the bank 252, and the like is cut out. In FIG. 20B, a partial region 255b including the window 251 of the building and the telephone pole 253 is cut out. It can also be said that a region where the feature points 62 are concentrated is cut out. Further, in FIG. 20C, an L-shaped large partial region 255c including the garage 254 and the road is cut out. In such a manner, the shape, the number, or the like of the partial regions 255 is not limited and may be appropriately set in accordance with, for example, the distribution of the feature points 62.

The extraction process unit 244 selects the feature points 62 included in each of the partial regions 255a to 255c as the reference feature points 62. Further, not only the process of selecting the feature points 62 but also the process of cutting out each reference image 250 in accordance with the shape of the partial region 255 may be executed. The method of setting the partial regions 255 or the like is not limited and may be appropriately set in accordance with, for example, the coarseness and fineness of the distribution of the feature points 62 and the extraction accuracy of the feature points 62.

In such a manner, appropriately selecting the reference feature points 62 from each reference image 250 allows the reference feature points 62 to be uniformly distributed on the entire image plane. Further, for example, setting the partial regions 255 allows only the necessary feature points 62 to be selected with high accuracy. For example, this allows information regarding a subject, from which the feature points 62 are difficult to extract, to be eliminated. As a result, the data amount can be reduced while improving data accuracy (accuracy of feature point 62).

Referring back to FIG. 17, a matching process (second matching process) between each of the plurality of pieces of registered reference information and the selected reference feature points 62 is executed (Step 208). It is determined whether the reference information generated on the basis of the reference feature points 62 needs to be registered or not (Step 209).

For example, in the determination in Step 203, whether the reference information to be generated needs to be registered or not is determined using the information of the standard reference image 250a. In the determination in Step 209, whether the reference information to be generated is registered or not is determined also using the information of the reference images 250b and 250c captured under other exposure conditions. This allows an improvement in determination accuracy regarding the presence/absence of the registration.

If it is determined that the registered reference information similar to the reference feature points 62 is present (No in Step 209), Step 211 is executed and the processes of Step 201 and the following steps are repeated. If it is determined that the registered reference information similar to the reference feature points 62 is not present (Yes in Step 209), the generation process unit 246 newly generates reference information on the basis of the reference feature points 62 (Step 210).

For example, as illustrated in FIG. 18, the acquisition unit 240 acquires, as the location information of the imaging spot, a result of the self location estimation process at a timing at which the imaging apparatus 220 captures each reference image 250, or the like. The generation process unit 246 calculates location coordinates of each reference feature point 62 selected from each reference image 250 on the basis of the location information of the imaging spot at which each piece of the reference information is captured.

For example, in the examples of FIGS. 20A, 20B, and 20C, the feature points 62 of the window 251 of the building, the bank 252 on the roadside, and the like are selected as the reference feature points 62 from the standard reference image 250aa (FIG. 20A). Three-dimensional coordinates (latitude, longitude, and altitude) of the feature points 62 (reference feature points 62) of the window 251 of the building, the bank 252, and the like in the map coordinate system are appropriately calculated on the basis of the latitude and longitude of the imaging spot at which the standard reference image 250aa is captured. Note that, in a case where the vehicle for map generation includes a distance sensor such as a ToF camera, a LiDAR sensor, or a laser range finder, depth information detected by the distance sensor or the like may be appropriately used.

Similarly, the location information of the reference feature point 62 selected from the reference image 250b is calculated on the basis of the location information of the imaging spot at which the reference image 250b (FIG. 20B) is captured. Further, the location information of the reference feature point 62 selected from the reference image 250c is calculated on the basis of the location information of the imaging spot at which the reference image 250c (FIG. 20B) is captured.

If the location information of the reference feature point 62 is calculated, information of the reference feature point 62 (location, feature quantity, and the like of feature point within image) and reference information including the location information are generated. The generated reference information is registered in the reference information database by the registration unit 247 (see FIG. 18).

On completion of the registration of the reference information, Step 211 is executed, and a process of acquiring the next reference image (standard reference image) is started.

In such a manner, in the reference information registration apparatus 200, the reference information is generated from the plurality of reference images 250 captured under different exposure conditions and is registered in the reference information database 230. Using the reference images 250 consecutively captured while changing the exposure conditions allows the reference information, in which the feature points 62 are evenly distributed on the entire image plane, to be easily generated without being affected by, for example, weather, a time period, or the like.

This allows matching accuracy or a success rate to be kept high, for example, even in a case of performing a matching process with an image captured in a time period different from the time period in which the reference information is generated. Therefore, time and efforts for generating reference information of different time periods at a similar imaging spot can be omitted, and the cost for establishment or maintenance of the reference information database can be sufficiently suppressed.

Further, using the reference feature point 62 selected on the basis of the feature point information improves the accuracy of the feature point 62 included in the reference information. For example, this allows enhancement of the matching accuracy of the reference information in the self location estimation process by the estimation target vehicle or the like and allows the location, the posture, or the like of the estimation target vehicle to be highly accurately estimated.

Other Embodiments

The present technology is not limited to the embodiment described above and can achieve other various embodiments.

In the first embodiment, the estimation feature points to be used in the self location estimation process are selected on the basis of the matching results of the second matching process between the reference information and the plurality of surrounding images (Step 108 in FIG. 8), but the present technology is not limited thereto. For example, in addition to the selection process based on the matching results, a process of selecting the estimation feature points or the like may be executed on the basis of the number of feature points extracted from each surrounding image, the distribution of the feature points, the extraction accuracy of the feature point, or the like. This allows an improvement in accuracy of the estimation feature point and allows the location or the posture of the vehicle to be estimated with sufficiently high accuracy.

In the embodiments described above, the determination unit determines whether the image capturing under a plurality of different exposure conditions is necessary or not. The present technology is not limited to this and, for example, a configuration without the determination unit may be employed. In other words, it may also be possible to provide a configuration in which image capturing under a plurality of exposure conditions is constantly executed.

In the embodiments described above, the acquisition unit downloads and acquires a plurality of pieces of reference information from the reference information database. The present technology is not limited to this. For example, surrounding images, reference images, and the like captured in a vehicle may be uploaded to a server or the like via a network, and the server or the like may appropriately execute the feature point extraction process, the matching process with the reference information, the location/posture information estimation process, and the like. The server or the like is caused to execute the processes necessary for the self location estimation process, which allows suppression of a process load in the vehicle, a communication load associated with the transmission/reception of the reference information, and the like.

In the first embodiment, the autonomous driving control unit installed in the vehicle executes the information processing method according to the present technology, which includes the self location estimation process and the like for the vehicle. Further, in the second embodiment, the reference information registration apparatus installed in the vehicle for map generation executes the information processing method according to the present technology, which includes the reference information generation process and the like. The present technology is not limited to this, and a cloud server may execute the information processing method according to the present technology. In other words, the functions of the autonomous driving control unit or the reference information registration apparatus may be installed in the cloud server. In this case, the cloud server operates as the information processing apparatus according to the present technology.

Further, a computer (autonomous driving control unit, reference information registration apparatus) installed in the vehicle and another computer (cloud server) communicable via a network or the like may work in conjunction with each other to execute the information processing method and the program according to the present technology and establish the information processing apparatus according to the present technology.

In other words, the information processing method and the program according to the present technology may be executed not only in a computer system configured by a single computer but also in a computer system in which a plurality of computers operates in conjunction with each other. Note that, in the present disclosure, the system means an aggregate of a plurality of components (such as apparatuses or modules (parts)) and it does not matter whether or not all the components are housed in the identical casing. Therefore, a plurality of apparatuses housed in separate casings and connected to one another via a network, and a single apparatus having a plurality of modules housed in a single casing are both the system.

The execution of the information processing method and the program according to the present technology by the computer system includes, for example, both of the case where the acquisition of the plurality of estimation images (surrounding image, reference image) captured under a plurality of exposure conditions, the execution of the process regarding the estimation of location/posture information of a vehicle, and the like are executed by a single computer and the case where those processes are executed by different computers. Further, the execution of the respective processes by a predetermined computer includes causing another computer to execute some or all of those processes and acquiring results thereof.

In other words, the information processing method and the program according to the present technology are also applicable to a cloud computing configuration in which one function is shared and cooperatively processed by a plurality of apparatuses via a network.

The description has been given while using the vehicle as an example of the mobile object hereinabove, but the present technology is not limited to an object capable of autonomous movement like a vehicle and is also applicable to, for example, equipment or the like moved by a user to carrying or wearing it. In other words, in the present disclosure, for example, terminals (mobile object terminals) moved by users of mobile devices such a smart phone, a head mounted display (HMD), and a tablet PC are also included in the mobile object. The self location estimation process and the like related to the present technology can also be executed for those mobile object terminals.

For example, a plurality of surrounding images is captured by a camera installed in a smart phone or the like from an identical imaging spot under a plurality of different exposure conditions. Executing a process similar to, for example, the flowchart of FIG. 8 on the basis of the plurality of captured surrounding images allows the self location of the smart phone to be estimated with high accuracy. As a result, for example, navigations, games, and the like using the technology of an augmented reality (AR) or the like can be executed with high accuracy.

Besides, the technology according to the present disclosure can be applied to various products. For example, the technology according to the present disclosure may be achieved as an apparatus installed in any kind of mobile object such as vehicles, electric vehicles, hybrid electric vehicles, motorcycles, bicycles, personal transporters, airplanes, drones, ships, robots, construction machinery, agricultural machinery (tractors), and the like.

Out of the feature parts according to the present technology described above, at least two feature parts can be combined. That is, the various feature parts described in the respective embodiments may be arbitrarily combined irrespective of the embodiments. Further, various effects described above are merely examples and are not limited, and other effects may be exerted.

Out of the feature parts of each embodiment described above, at least two feature parts can be combined.

Note that the present technology may also be configured as below.

(1) An information processing apparatus, including:
an acquisition unit that acquires a plurality of estimation images captured from an identical spot under a plurality of exposure conditions different from each other, to estimate mobile object information including at least one of a location or a posture of a mobile object; and
an execution unit that executes a process regarding estimation of the mobile object information on the basis of the plurality of acquired estimation images.

(2) The information processing apparatus according to (1), in which
each of the plurality of estimation images is captured by an imaging apparatus installed in the mobile object, and
the execution unit estimates the mobile object information on the basis of the plurality of acquired estimation images.

(3) The information processing apparatus according to (2), in which
the acquisition unit is capable of acquiring reference information generated on the basis of location information of a predetermined spot and an image for reference captured from the predetermined spot, and
the execution unit estimates the mobile object information on the basis of the plurality of acquired estimation images and the acquired reference information.

(4) The information processing apparatus according to (3), in which
the reference information includes a feature point of the image for reference,
the execution unit extracts a feature point of each of the plurality of estimation images and executes a matching process between the extracted feature point and the feature point of the reference information.

(5) The information processing apparatus according to (4), in which
the reference information includes location information of the feature point of the image for reference, and
the execution unit selects a feature point for estimating the mobile object information from feature points of the plurality of estimation images on the basis of matching results of the matching process and estimates the mobile object information on the basis of the selected feature point and the location information of the feature point of the image for reference.

(6) The information processing apparatus according to any one of (1) to (5), in which
the acquisition unit is capable of acquiring location information of the identical spot at which the plurality of estimation images is captured, and
the execution unit generates reference information for estimating the mobile object information, on the basis of the plurality of acquired estimation images and the acquired location information of the identical spot.

(7) The information processing apparatus according to (6), in which
the execution unit extracts a feature point of each of the plurality of estimation images and selects a feature point for generating the reference information, on the basis of feature point information regarding the extracted feature point.

(8) The information processing apparatus according to (7), in which
the feature point information includes at least one of the number of the feature points, a distribution of the feature points, or extraction accuracy of the feature points.

(9) The information processing apparatus according to (7) or (8), in which
the execution unit calculates location information of the selected feature point on the basis of the location information of the identical spot and generates the reference information including the calculated location information of the feature point.

(10) The information processing apparatus according to any one of (1) to (9), in which
each of the plurality of exposure conditions includes at least one of an exposure time or an exposure sensitivity.

(11) The information processing apparatus according to any one of (1) to (10), further including
an imaging control unit that controls image capturing from the identical spot.

(12) The information processing apparatus according to (11), in which
the imaging control unit sets a standard exposure condition that is a standard, and
the acquisition unit acquires a standard estimation image captured under the standard exposure condition.
(13) The information processing apparatus according to (12), in which
the imaging control unit divides the standard estimation image into a plurality of partial regions on the basis of at least one of a feature point extracted from the standard estimation image or an exposure state of the standard estimation image and sets another exposure condition different from the standard exposure condition by executing an auto exposure for each of the plurality of partial regions.
(14) The information processing apparatus according to (12) or (13), in which
the imaging control unit sets another exposure condition different from the standard exposure condition with the standard exposure condition as a standard, on the basis of environment information regarding a surrounding environment of the mobile object.
(15) The information processing apparatus according to any one of (11) to (14), in which
the imaging control unit separates timings at which the plurality of estimation images is captured from a timing at which another image different from the plurality of estimation images is captured.
(16) The information processing apparatus according to any one of (11) to (14), in which
the imaging control unit sets a timing at which each of the plurality of estimation images is captured to a constant interval.
(17) The information processing apparatus according to any one of (11) to (16), in which
the imaging control unit is capable of sequentially executing image capturing of a first estimation image and a second estimation image, and
the information processing apparatus further includes a determination unit that determines whether image capturing of the second estimation image is necessary or not on the basis of the first estimation image acquired by the acquisition unit.
(18) An information processing method to be executed by a computer system, the information processing method including:
acquiring a plurality of estimation images captured from an identical spot under a plurality of exposure conditions different from each other, to estimate mobile object information including at least one of a location or a posture of a mobile object; and
executing a process regarding estimation of the mobile object information on the basis of the plurality of acquired estimation images.
(19) A program causing a computer system to execute the steps of:
acquiring a plurality of estimation images captured from an identical spot under a plurality of exposure conditions different from each other, to estimate mobile object information including at least one of a location or a posture of a mobile object; and
executing a process regarding estimation of the mobile object information on the basis of the plurality of acquired estimation images.
(20) A mobile object, including:
an acquisition unit that acquires a plurality of estimation images captured from an identical spot under a plurality of exposure conditions different from each other, to estimate mobile object information including at least one of a location or a posture of a mobile object;
an execution unit that executes a process of estimating the mobile object information on the basis of the plurality of acquired estimation images;
a planning unit that generates an action plan on the basis of the estimated mobile object information; and
a control unit that controls a behavior on the basis of the action plan.

REFERENCE SIGNS LIST 10 vehicle
20, 220 imaging apparatus
21, 21a to 21b imaging spot
30, 230 reference information database
31, 31a to 31c reference information
33 estimation reference information
40, 240 acquisition unit
41, 241 estimation unit
42, 242 imaging control unit
43, 243 determination unit
50, 50a to 50c surrounding image
250, 250a to 250c reference image
60 feature point
61 estimation feature point
62 reference feature point
100 vehicle control system
132 self location estimation unit
200 reference information registration apparatus

The invention claimed is:
1. An information processing apparatus, comprising:
a central processing unit (CPU) configured to:
acquire a plurality of estimation images captured from an identical spot, wherein
the plurality of estimation images includes a first estimation image and a second estimation image, and
the first estimation image has a standard exposure condition different from the second estimation image;
extract a plurality of first feature points of each of the first estimation image and the second estimation image;
divide the first estimation image into a plurality of partial regions based on at least one of a feature point extracted from the plurality of first feature points of the first estimation image or an exposure state of the first estimation image;
set a specific exposure condition different from the standard exposure condition by execution of an auto exposure for each of the plurality of partial regions;
acquire reference information based on location information of a determined spot, wherein the reference information includes a plurality of second feature points of a reference image;
select an estimation feature point from the plurality of first feature points based on a similarity between the plurality of first feature points and the plurality of second feature points; and
estimate mobile object information that includes at least one of a location or a posture of a mobile object based on the selected estimation feature point.
2. The information processing apparatus according to claim 1, wherein the CPU is further configured to acquire each of the plurality of estimation images from an imaging apparatus installed in the mobile object.

3. The information processing apparatus according to claim 2, wherein the CPU is further configured to:
acquire the reference image captured from the determined spot, and
estimate the mobile object information based on the plurality of estimation images and the acquired reference information.

4. The information processing apparatus according to claim 1, wherein
the reference information includes location information of the plurality of second feature points of the reference image, and
the CPU is further configured to estimate the mobile object information based the selected estimation feature point and the location information of the plurality of second feature points of the reference image.

5. The information processing apparatus according to claim 1, wherein the CPU is further configured to:
acquire location information of the identical spot at which the plurality of estimation images is captured, and
generate the reference information for the estimation of the mobile object information, wherein the generation of the reference information is based on the plurality of estimation images and the acquired location information of the identical spot.

6. The information processing apparatus according to claim 5, wherein
the CPU is further configured to select a specific feature point from the plurality of first feature points for the generation of the reference information, and
the selection of the specific feature point is based on feature point information regarding the plurality of first feature points.

7. The information processing apparatus according to claim 6, wherein
the feature point information includes at least one of a number of the plurality of first feature points, a distribution of the plurality of first feature points, or extraction accuracy of the plurality of first feature points.

8. The information processing apparatus according to claim 6, wherein the CPU is further configured to:
calculate location information of the selected specific feature point based on the location information of the identical spot; and
generate the reference information that includes the calculated location information of the selected specific feature point.

9. The information processing apparatus according to claim 1, wherein
the exposure condition includes at least one of an exposure time or an exposure sensitivity.

10. The information processing apparatus according to claim 1, wherein the CPU is further configured to control capture of the plurality of estimation images from the identical spot.

11. The information processing apparatus according to claim 1, wherein the CPU is further configured to set the specific exposure condition, based on environment information that includes a surrounding environment of the mobile object.

12. The information processing apparatus according to claim 10, wherein the CPU is further configured to separate timings at which the plurality of estimation images is captured from a timing at which another image different from the plurality of estimation images is captured.

13. The information processing apparatus according to claim 10, wherein the CPU is further configured to set a timing at which each of the plurality of estimation images is captured to a constant interval.

14. The information processing apparatus according to claim 10, wherein the CPU is further configured to:
sequentially execute image capture of the first estimation image and the second estimation image; and
determine whether the image capture of the second estimation image is necessary based on the first estimation image.

15. An information processing method, comprising:
acquiring a plurality of estimation images captured from an identical spot, wherein
the plurality of estimation images includes a first estimation image and a second estimation image, and
the first estimation image has a standard exposure condition different from the second estimation image;
extracting a plurality of first feature points of each of the first estimation image and the second estimation image;
dividing the first estimation image into a plurality of partial regions based on at least one of a feature point extracted from the plurality of first feature points of the first estimation image or an exposure state of the first estimation image;
setting a specific exposure condition different from the standard exposure condition by execution of an auto exposure for each of the plurality of partial regions;
acquiring reference information based on location information of a determined spot, wherein the reference information includes a plurality of second feature points of a reference image;
selecting an estimation feature point from the plurality of first feature points based on a similarity between the plurality of first feature points and the plurality of second feature points; and
estimating mobile object information that includes at least one of a location or a posture of a mobile object based on the selected estimation feature point.

16. A non-transitory computer-readable medium having stored thereon, computer-executable instructions, which when executed by a computer, cause the computer to execute operations, the operations comprising:
acquiring a plurality of estimation images captured from an identical spot, wherein
the plurality of estimation images includes a first estimation image and a second estimation image, and
the first estimation image has a standard exposure condition different from the second estimation image;
extracting a plurality of first feature points of each of the first estimation image and the second estimation image;
dividing the first estimation image into a plurality of partial regions based on at least one of a feature point extracted from the plurality of first feature points of the first estimation image or an exposure state of the first estimation image;
setting a specific exposure condition different from the standard exposure condition by execution of an auto exposure for each of the plurality of partial regions;
acquiring reference information based on location information of a determined spot, wherein the reference information includes a plurality of second feature points of a reference image;

selecting an estimation feature point from the plurality of first feature points based on a similarity between the plurality of first feature points and the plurality of second feature points; and estimating mobile object information that includes at least one of a location or a posture of a mobile object based on the selected estimation feature point.

17. A mobile object, comprising:

a central processing unit (CPU) configured to:
- acquire a plurality of estimation images captured from an identical spot, wherein
  - the plurality of estimation images includes a first estimation image and a second estimation image, and
  - the first estimation image has a standard exposure condition different from the second estimation image;
- extract a plurality of first feature points of each of the first estimation image and the second estimation image;
- divide the first estimation image into a plurality of partial regions based on at least one of a feature point extracted from the plurality of first feature points of the first estimation image or an exposure state of the first estimation image;
- set a specific exposure condition different from the standard exposure condition by execution of an auto exposure for each of the plurality of partial regions;
- acquire reference information based on location information of a determined spot, wherein the reference information includes a plurality of second feature points of a reference image;
- select an estimation feature point from the plurality of first feature points based on a similarity between the plurality of first feature points and the plurality of second feature points;
- estimate mobile object information that includes at least one of a location or a posture of the mobile object based on the selected estimation feature point;
- generate an action plan based on the estimated mobile object information; and
- control a behavior of the mobile object based on the action plan.

* * * * *